US012730896B1

(12) United States Patent
Millar et al.

(10) Patent No.: US 12,730,896 B1
(45) **Date of Patent: *Sep. 8, 2026**

(54) REFINING A MACHINE LEARNING MODEL FOR CALCULATING CONFIDENCE SCORES ASSOCIATED WITH POTENTIAL SECURITY VULNERABILITIES

(71) Applicant: Rapid7, Inc., Boston, MA (US)

(72) Inventors: Stuart Millar, Belfast (GB); Denis Podgurskii, Belfast (GB)

(73) Assignee: Rapid7, Inc., Boston, MA (US)

( * ) Notice: Subject to any disclaimer, the term of this patent is extended or adjusted under 35 U.S.C. 154(b) by 464 days.

This patent is subject to a terminal disclaimer.

(21) Appl. No.: 17/389,700

(22) Filed: Jul. 30, 2021

(51) Int. Cl.
*G06F 21/57* (2013.01)
*G06N 20/00* (2019.01)

(52) U.S. Cl.
CPC ........... *G06F 21/577* (2013.01); *G06N 20/00* (2019.01); *G06F 2221/034* (2013.01)

(58) Field of Classification Search
CPC . G06F 21/577; G06F 2221/034; G06N 20/00; H04L 63/1416; H04L 63/1433
See application file for complete search history.

(56) References Cited

U.S. PATENT DOCUMENTS 8,136,163 B2 * 3/2012 Birt .................... G06F 11/008 726/25
8,745,746 B1 * 6/2014 Jain .................... H04W 12/128 726/25
9,436,829 B2 * 9/2016 Tripp .................... G06F 21/577
9,516,053 B1 * 12/2016 Muddu .................... G06N 20/20
9,923,916 B1 * 3/2018 McClintock .................... G06F 21/53
10,097,574 B2 * 10/2018 Tripp .................... G06N 20/00
10,318,740 B2 * 6/2019 Toledano .................... H04L 63/06
10,735,272 B1 * 8/2020 Saurabh .................... H04L 41/14
10,924,503 B1 * 2/2021 Pereira .................... H04L 63/20
11,023,590 B2 * 6/2021 Ionescu .................... G06F 21/577
11,030,318 B1 * 6/2021 Shavro .................... G06F 21/577
11,106,801 B1 * 8/2021 Levine .................... G06F 21/577
11,637,862 B1 * 4/2023 Sopan .................... G06N 20/00 726/23
11,763,007 B1 * 9/2023 Nalluri .................... G06F 21/577 726/25

(Continued)

FOREIGN PATENT DOCUMENTS

CA 3039795 A1 * 5/2018 .................... G06N 20/00

*Primary Examiner* — David Garcia Cervetti
(74) *Attorney, Agent, or Firm* — Ashwin Anand

(57) ABSTRACT

Various embodiments include systems and methods of implementing a machine learning (ML) model for calculating confidence scores associated with potential security vulnerabilities. In some embodiments, the ML model may be used to determine a confidence score for a particular potential security vulnerability. According to some embodiments, input indicative of a change of verification status for the particular potential security vulnerability may be received via a vulnerability details graphical user interface. Responsive to determining that the confidence score generated by the ML model is inconsistent with the change of verification status, the change of verification status may be sent as analyst feedback data to one or model training components of the ML model. The model training component(s) may be utilized to refine the ML model based at least in part on the analyst feedback data.

20 Claims, 15 Drawing Sheets

(56) References Cited

U.S. PATENT DOCUMENTS

| | | | | |
|---|---|---|---|---|
| 11,876,821 | B1 * | 1/2024 | Pratt | H04L 63/1425 |
| 12,093,397 | B1 * | 9/2024 | Lin | G06F 21/577 |
| 12,118,095 | B1 * | 10/2024 | Millar | G06N 20/00 |
| 2009/0038014 | A1 * | 2/2009 | Force | H04L 63/1433 726/25 |
| 2009/0320137 | A1 * | 12/2009 | White | H04L 63/1433 707/999.102 |
| 2012/0198549 | A1 * | 8/2012 | Antonakakis | H04L 61/4511 726/22 |
| 2013/0160130 | A1 * | 6/2013 | Mendelev | G06F 21/56 726/25 |
| 2013/0205398 | A1 * | 8/2013 | Kalman | H04L 63/1433 726/25 |
| 2014/0075560 | A1 * | 3/2014 | Guy | G06F 21/577 726/25 |
| 2014/0082733 | A1 * | 3/2014 | Benefield | H04L 63/1441 726/25 |
| 2014/0082737 | A1 * | 3/2014 | Beskrovny | H04L 63/1433 726/25 |
| 2014/0090064 | A1 * | 3/2014 | Pistoia | G06F 21/577 726/25 |
| 2015/0163242 | A1 * | 6/2015 | Laidlaw | H04L 63/1425 726/22 |
| 2015/0254555 | A1 * | 9/2015 | Williams, Jr. | G06N 3/084 706/14 |
| 2016/0315961 | A1 * | 10/2016 | Duer | H04L 63/1433 |
| 2017/0093902 | A1 * | 3/2017 | Roundy | G06F 21/554 |
| 2017/0116421 | A1 * | 4/2017 | M C | G06F 21/577 |
| 2017/0244737 | A1 * | 8/2017 | Kuperman | H04L 63/1416 |
| 2017/0286671 | A1 * | 10/2017 | Chari | G06F 21/552 |
| 2018/0145995 | A1 * | 5/2018 | Roeh | H04L 43/12 |
| 2018/0183827 | A1 * | 6/2018 | Zorlular | H04L 63/1416 |
| 2018/0219881 | A1 * | 8/2018 | Kayacik | G06F 21/552 |
| 2018/0234435 | A1 * | 8/2018 | Cohen | H04L 63/1416 |
| 2018/0367561 | A1 * | 12/2018 | Givental | H04L 63/1433 |
| 2019/0166149 | A1 * | 5/2019 | Gerrick | G06Q 10/10 |
| 2019/0377880 | A1 * | 12/2019 | Kolychev | G06N 3/0442 |
| 2020/0050760 | A1 * | 2/2020 | El-Moussa | H04L 63/145 |
| 2020/0057858 | A1 * | 2/2020 | Sharma | G06F 21/563 |
| 2020/0089848 | A1 * | 3/2020 | Abdelaziz | G06N 20/00 |
| 2020/0134188 | A1 * | 4/2020 | Bagheri | G06N 3/045 |
| 2020/0304534 | A1 * | 9/2020 | Rakesh | H04L 63/1433 |
| 2020/0327222 | A1 * | 10/2020 | Chhabra | H04L 63/0421 |
| 2020/0401702 | A1 * | 12/2020 | Karabatis | G06F 8/75 |
| 2020/0412757 | A1 * | 12/2020 | Siddiq | H04L 63/20 |
| 2021/0157919 | A1 * | 5/2021 | Stockdale | H04L 63/1408 |
| 2021/0168165 | A1 * | 6/2021 | Alsaeed | G06N 20/00 |
| 2021/0211450 | A1 * | 7/2021 | Aleidan | H04L 63/1433 |
| 2021/0264025 | A1 * | 8/2021 | Givental | G06N 3/0464 |
| 2021/0273967 | A1 * | 9/2021 | Vela | H04L 63/1466 |
| 2021/0279644 | A1 * | 9/2021 | Givental | G06N 3/082 |
| 2021/0314296 | A1 * | 10/2021 | O'Hara | G06N 20/00 |
| 2021/0342742 | A1 * | 11/2021 | G Rao | G06N 20/00 |
| 2021/0352093 | A1 * | 11/2021 | Hassanzadeh | H04L 63/1416 |
| 2021/0400058 | A1 * | 12/2021 | Filonov | H04L 63/1416 |
| 2022/0014554 | A1 * | 1/2022 | Vasu | H04L 63/102 |
| 2022/0108020 | A1 * | 4/2022 | Dang | G06F 21/563 |
| 2022/0321590 | A1 * | 10/2022 | Sharma | H04L 63/20 |
| 2022/0329630 | A1 * | 10/2022 | Li | G06F 21/577 |
| 2022/0368700 | A1 * | 11/2022 | Bagaria | H04L 63/1425 |
| 2023/0210472 | A1 * | 7/2023 | Berckmans | A61B 5/024 600/301 |
| 2023/0281317 | A1 * | 9/2023 | Clement | G06F 8/75 726/25 |
| 2023/0388788 | A1 * | 11/2023 | Kunz | H04L 9/3242 |
| 2024/0330602 | A1 * | 10/2024 | Lamba | G06F 40/47 |
| 2025/0335601 | A1 * | 10/2025 | Fujita | G06F 21/577 |

* cited by examiner

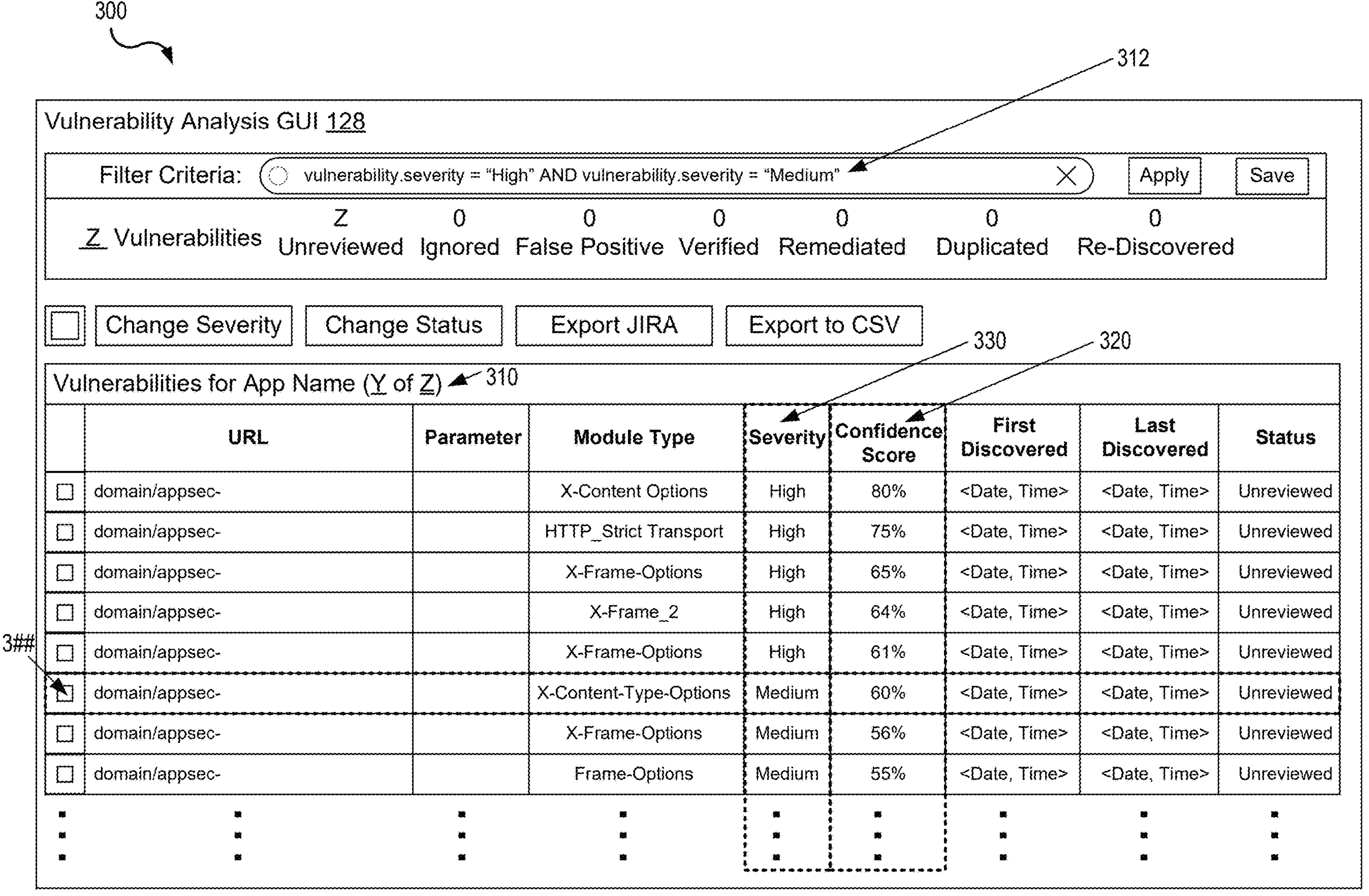

| | URL | Parameter | Module Type | Severity | Confidence Score | First Discovered | Last Discovered | Status |
|---|---|---|---|---|---|---|---|---|
| ☐ | domain/appsec- | | X-Content Options | High | 80% | <Date, Time> | <Date, Time> | Unreviewed |
| ☐ | domain/appsec- | | HTTP_Strict Transport | High | 75% | <Date, Time> | <Date, Time> | Unreviewed |
| ☐ | domain/appsec- | | X-Frame-Options | High | 65% | <Date, Time> | <Date, Time> | Unreviewed |
| ☐ | domain/appsec- | | X-Frame_2 | High | 64% | <Date, Time> | <Date, Time> | Unreviewed |
| ☐ | domain/appsec- | | X-Frame-Options | High | 61% | <Date, Time> | <Date, Time> | Unreviewed |
| ☐ | domain/appsec- | | X-Content-Type-Options | Medium | 60% | <Date, Time> | <Date, Time> | Unreviewed |
| ☐ | domain/appsec- | | X-Frame-Options | Medium | 56% | <Date, Time> | <Date, Time> | Unreviewed |
| ☐ | domain/appsec- | | Frame-Options | Medium | 55% | <Date, Time> | <Date, Time> | Unreviewed |
| ⋮ | ⋮ | ⋮ | ⋮ | ⋮ | ⋮ | ⋮ | ⋮ | ⋮ |

FIG. 3

Obtain scan traffic data associated with one or more potential security vulnerabilities detected via one or more scan engines that implement application security testing.
810

Determine, using a machine learning (ML) model for calculating confidence scores associated with potential security vulnerabilities detected via application security testing, respective confidence scores for each of the individual potential security vulnerabilities. The ML model is trained using vulnerability data associated with a set of previously identified vulnerabilities, where the vulnerability data indicates each individual previously identified vulnerability is a true positive or a false positve.
820

Responsive to a request for scan findings associated with a particular application, display the respective confidence scores via a vulnerability analysis GUI.
830

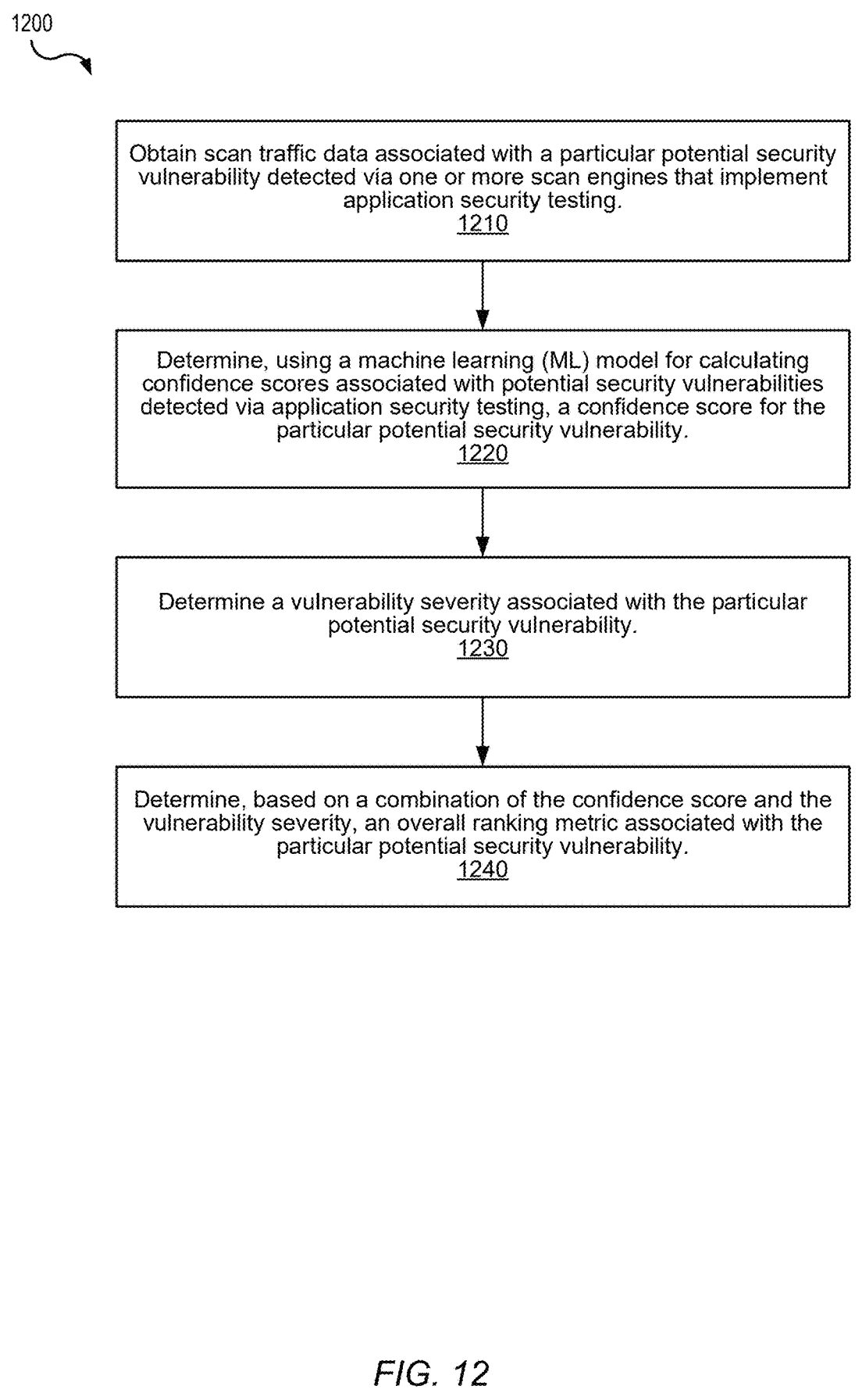

Obtain scan traffic data associated with a particular potential security vulnerability detected via one or more scan engines that implement application security testing.
1210

Determine, using a machine learning (ML) model for calculating confidence scores associated with potential security vulnerabilities detected via application security testing, a confidence score for the particular potential security vulnerability.
1220

Determine a vulnerability severity associated with the particular potential security vulnerability.
1230

Determine, based on a combination of the confidence score and the vulnerability severity, an overall ranking metric associated with the particular potential security vulnerability.
1240

*FIG. 12*

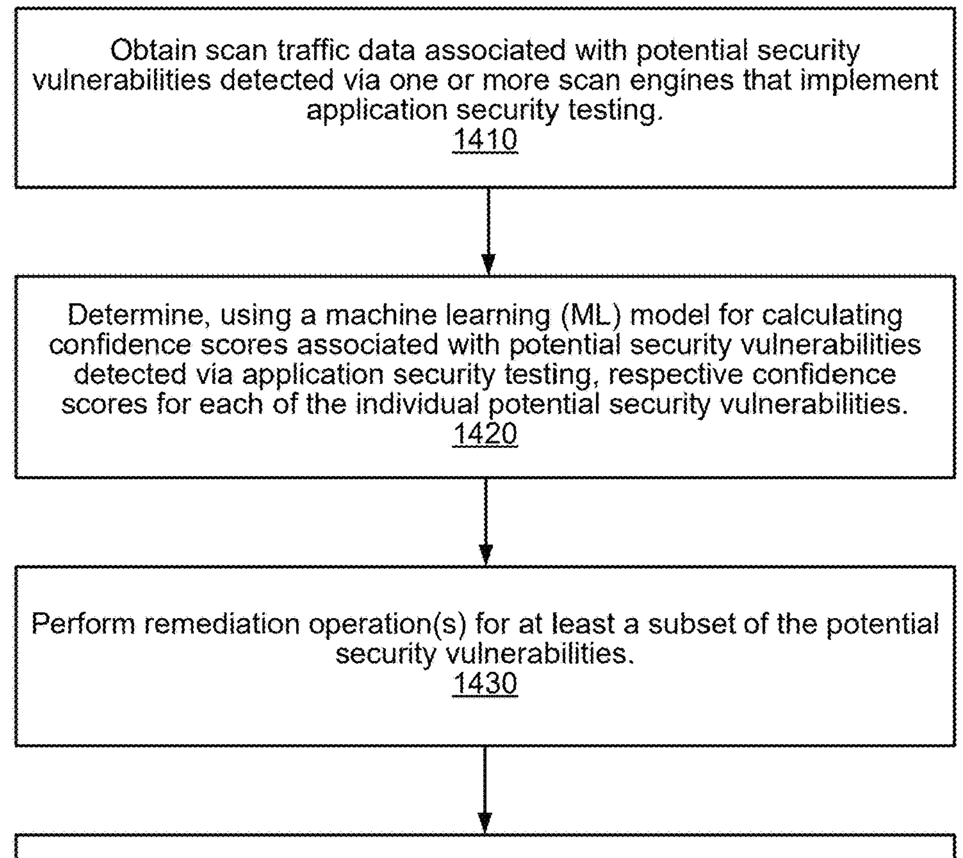
*FIG. 14*

REFINING A MACHINE LEARNING MODEL FOR CALCULATING CONFIDENCE SCORES ASSOCIATED WITH POTENTIAL SECURITY VULNERABILITIES

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

Cybersecurity monitoring teams may face a large workload when reviewing potential web security vulnerabilities that may be discovered using web scanning tools. These potential vulnerabilities may be identified via multiple automated penetration tests and, in some cases, can include a significant number of findings. In a live scenario, with the added pressure of the web application under scrutiny still being in production (and potentially exploitable by an attacker), each of these findings is then studied manually by an analyst to determine whether it is an actual vulnerability or a false alarm. With this sheer volume of findings, reviewing each one manually within a satisfactory timeframe may not be possible for the analyst. Such an exhaustive review process may eventually result in alert fatigue, with vulnerabilities possibly being overlooked, potentially risking harm to a customer's social, technical or financial reputation. Additionally, such an exhaustive review process may extend the time-to-fix, due to the time for the analyst to first verify the potential vulnerabilities before a remediation process can begin.

SUMMARY OF EMBODIMENTS

The systems and methods described herein relate to a machine learning (ML) model for calculating confidence scores associated with potential security vulnerabilities detected via application security testing. The ML model of the present disclosure may be trained using information obtained from cybersecurity analysts that distinguishes numerous previously identified security vulnerabilities as either verified true positive (TP) findings or false positive (FP) findings. By training the ML model to identify nuances between the verified true positive findings and false positive findings, the ML model may then be utilized to generate confidence scores for potential security vulnerabilities identified using one or more scanning tools. By presenting these confidence scores to an analyst via a user interface, the analyst may be able to study those findings with higher confidence scores before studying other findings with lower confidence scores. This approach may provide significant time savings for the analyst and potentially reduce alert fatigue, compared to conventional methods in which the analyst manually investigates each finding one at a time with no indication of a likelihood that each individual finding represents a real vulnerability.

BRIEF DESCRIPTION OF THE DRAWINGS

FIG. 3 is a diagram illustrating an example of a vulnerability analysis GUI that identifies potential security vulnerabilities that are sorted according to severity and associated confidence scores calculated using the ML model, in accordance with some embodiments.

FIG. 8 is a flowchart that illustrates an example process of utilizing a machine learning model for calculating confidence scores associated with potential security vulnerabilities detected via application security testing, according to some embodiments.

FIG. 12 is a flowchart that illustrates an example process of utilizing confidence scores calculated using the ML model in combination with one or more other metrics to produce an overall score, according to some embodiments.

FIG. 14 is a flowchart that illustrates an example process of utilizing confidence scores calculated by a ML model to evaluate a security vulnerability remediation attempt, according to some embodiments.

Figure 1:
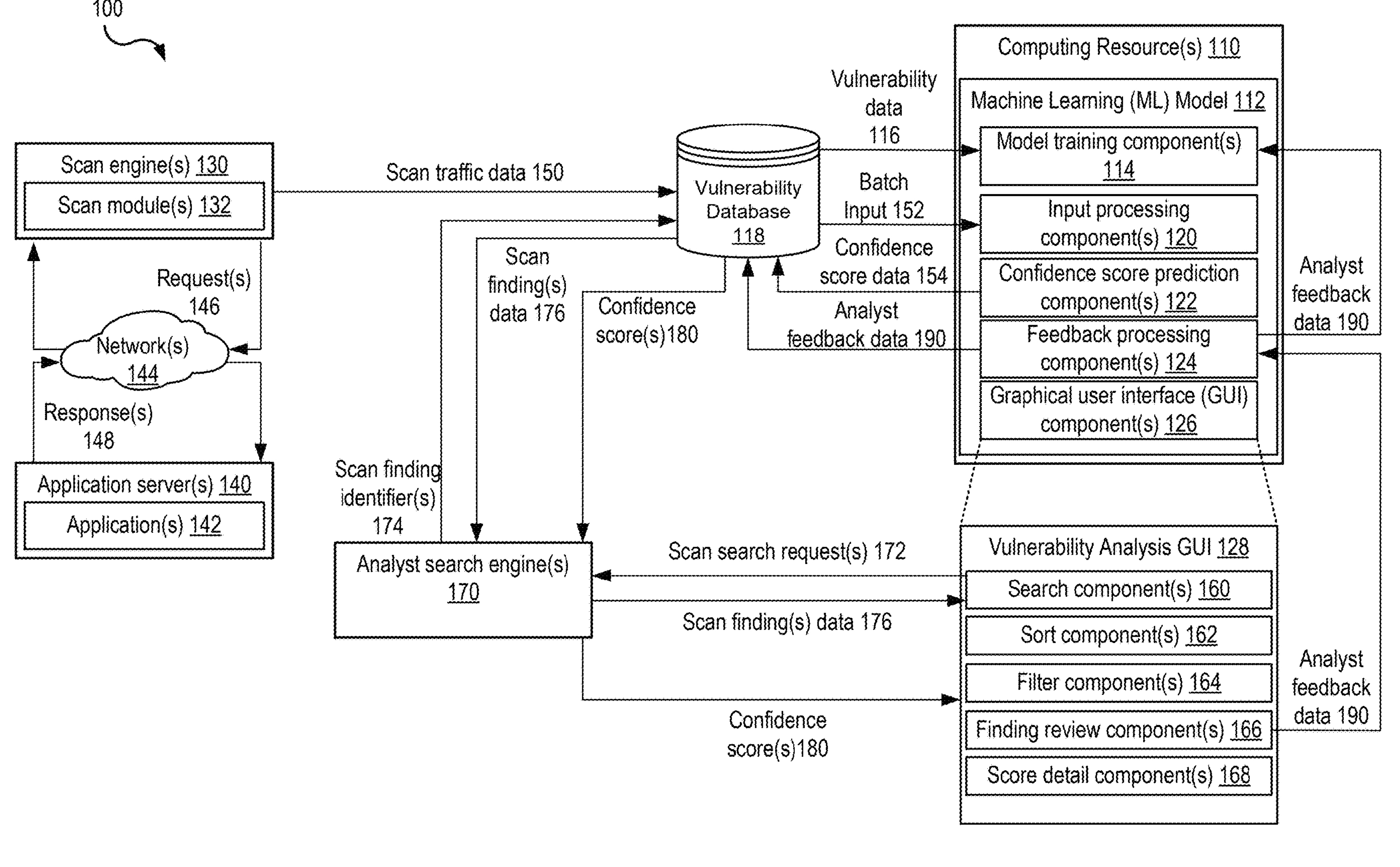
FIG. 1 is a block diagram illustrating an example system that implements a machine learning (ML) model for calculating confidence scores associated with potential security vulnerabilities detected via application security testing, in accordance with some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes systems and methods of utilizing machine learning (ML) to address various shortcomings of existing manual web application security monitoring systems by ranking or filtering large volumes of potential alerts in a user interface (UI) to prioritize those issues which are most likely to be real and true (also referred to herein as "true positives"), rather than false alarms (also referred to herein as "false positives"). Alongside detecting security vulnerabilities themselves, management of false positives is a significant problem in cybersecurity monitoring. As these false alarms can be more frequent than real alerts, the false positive rate in production directly affects the uptake of automated systems. Furthermore, ML models that automatically learn and encapsulate domain knowledge may provide savings on the labor-intensive maintenance of manually engineered, hard-coded banks of detection rules. Automated web application security is a suitable candidate for the application of this ML approach to ranking potential vulnerabilities. In this area, time savings is important to reduce exposure and improve security postures because the sooner that a vulnerability can be verified and fixed, the smaller the window of opportunity that is available for an attacker to exploit the vulnerability.

In the present disclosure, ML may be utilized to identify nuances between verified true positive (TP) findings and false positive (FP) findings and to update an analyst's user interface accordingly by ranking the analyst's workload. In the system of the present disclosure, each newly discovered potential vulnerability that is identified using one or more scanning tools may be accompanied by a confidence score produced by a ML model. The ML model may be trained with numerous previous TP and FP findings from cybersecurity analysts. As such, the confidence score that may be presented to the analyst as a percentage (in some cases) in the analyst's user interface may represent a likelihood that a given potential finding is indeed a real TP vulnerability. Further, multiple potential vulnerabilities identified in a scan may be ranked when presented in the analyst's user interface, thereby enabling the analyst to study those findings with the highest confidence scores first. The scalable, automated process of the present disclosure may provide significant time savings across a large corpus of findings, compared to conventional methods in which the analyst manually investigates each finding one at a time with no indication of a likelihood that each individual finding represents a real vulnerability.

According to some aspects of the present disclosure, a ML model may be trained with existing vulnerability data to discriminate between TP and FP findings. In some embodiments, when tested with a new potential vulnerability, the ML model may output a confidence score representing (e.g., as a percentage) a likelihood that the new potential vulnerability is a true positive. This confidence score may be presented via an analyst's user interface, which may allow the analyst to first investigate the findings that are most likely to be true positives (i.e., that are least likely to be false positives). With potentially tens of thousands of individual findings per customer, this approach may provide significant time savings compared to an approach in which the analyst examines each potential vulnerability in an arbitrary order.

According to some aspects of the present disclosure, software, hardware, or a combination thereof, may utilize machine learning to encapsulate domain knowledge in a model that outputs a confidence score for each finding identified using one or more scanning tools. In some cases, such findings may be ranked by confidence scores, for presentation to an analyst in ranked order. This ranking by confidence score may enable an analyst to first address potential vulnerabilities that the ML model identifies as most likely to be real vulnerabilities, rather than applying a more arbitrary selection process for review that may waste both the analyst's time and cognitive effort by investigating false positives. The information may be presented clearly in a user interface to allow the analyst to first review those findings with the highest confidence scores, potentially resulting in a faster verification time and ultimately a faster remediation time. Findings that the ML model identifies as having a greater likelihood of being false alarms may be ranked lower based on their relatively low confidence scores. At scale, the automated augmentation of an analyst's decision-making process provided by the systems and methods of the present disclosure may significantly improve efficiency and effectiveness.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements a ML model 112 for calculating confidence scores associated with potential security vulnerabilities detected via application security testing, in accordance with some embodiments.

Figure 15:
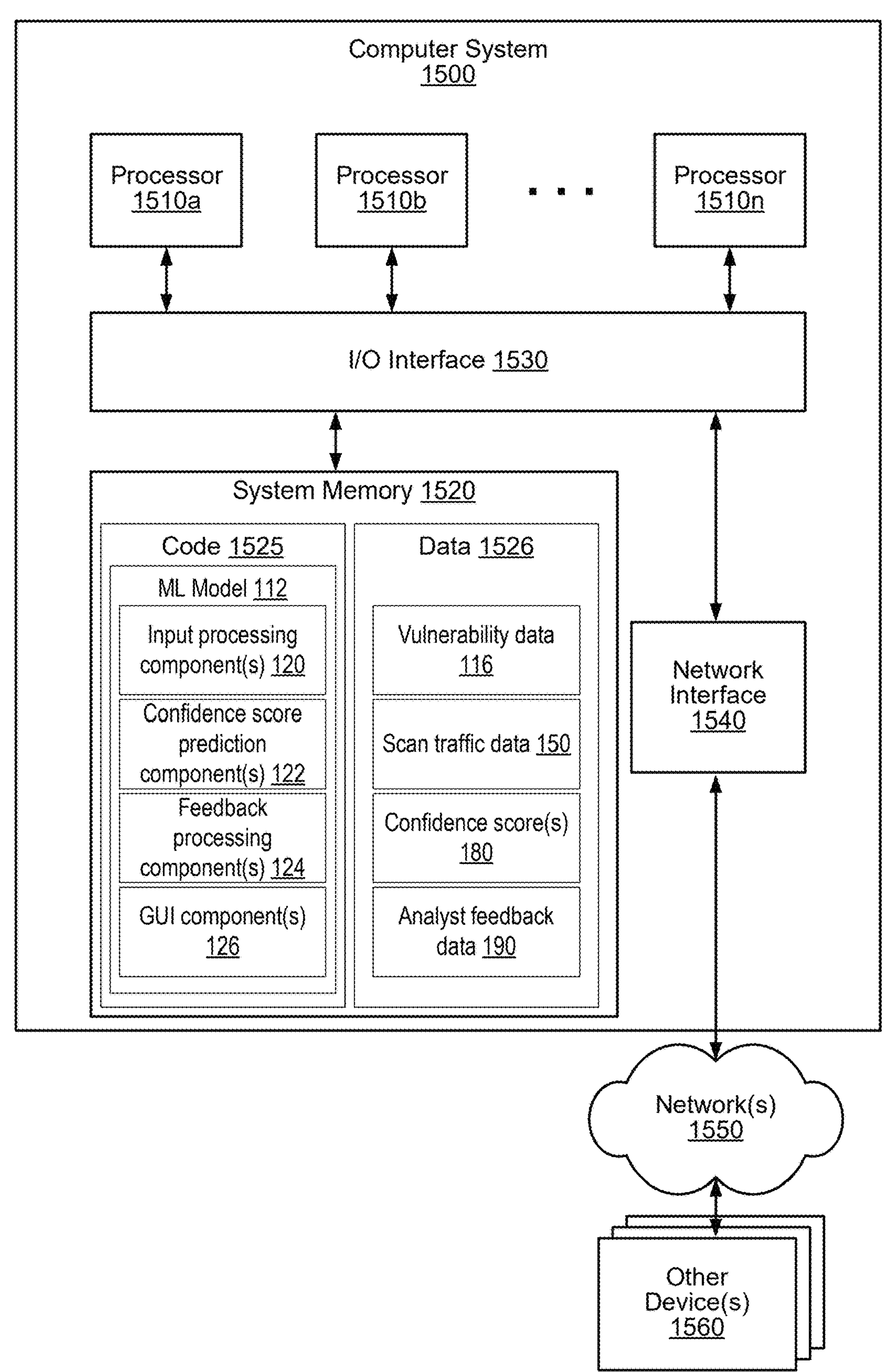
FIG. 15 is a block diagram illustrating an example computer system that may be used to implement one or more portions of a system that implements a ML model for calculating confidence scores associated with potential security vulnerabilities detected via application security testing, according to some embodiments.

FIG. 1 depicts one or more computing resources 110, which may include one or more hardware processors with associated memory (not shown, see e.g., FIG. 15). The computing resource(s) 110 may include software, hardware, or a combination thereof, which may be configured to implement the ML model 112 that may be utilized for calculating confidence scores associated with potential security vulnerabilities detected via application security testing. FIG. 1 further illustrates that the computing resource(s) 110 may be configured to implement multiple components associated with various features of the ML model 112, according to some embodiments.

In the embodiment depicted in FIG. 1, the ML model 112 includes one or more model training components 114. In order to train the ML model 112 to be able to generate confidence scores, the model training component(s) 114 analyze vulnerability data 116 that may be stored at a vulnerability database 118. The vulnerability data 116 may include a significant amount of data related to numerous previously identified true positive vulnerabilities and false positive vulnerabilities as labeled by cybersecurity analysts (also referred to herein as "analysts" or "triagers"). Based on the vulnerability data 116 stored at the vulnerability database 118, the model training component(s) 114 may be utilized to train the ML model 112 to discriminate between true positive vulnerabilities and false positive vulnerabilities. Accordingly, with regard to the vulnerability data 116 that is used by the model training component(s) 114, the more data that has been previously labeled by cybersecurity analysts may correlate with the accuracy of subsequent predictions from the ML model 112.

In the embodiment depicted in FIG. 1, the ML model 112 further includes one or more input processing components 120, one or more confidence score prediction components 122, one or more feedback processing components 124, and one or more graphical user interface (GUI) components 126.

FIG. 1 illustrates one or more scan engines 130 that may include one or more scan modules 132, each of which may be utilized to scan for various security vulnerabilities at one or more application servers 140 that host one or more applications 142, according to some embodiments. For example, the application(s) 142 may correspond to one or more web applications that are hosted "in the cloud" at the application server(s) 140 and accessible via one or more networks 144 (e.g., the internet). In some cases, the application(s) 142 may correspond to a single web application, while in other cases there may be numerous web applications. The process of scanning for potential security vulnerabilities may include communicating information via the network(s) 144. For example, FIG. 1 illustrates that the scan module(s) 132 of the scan engine(s) 130 may generate one or more requests 146, which may be communicated via the network(s) 144 to the application(s) 142 hosted at the application server(s) 140. Responsive to the request(s) 146, the application(s) 142 may generate one or more responses 148, which may be communicated via the network(s) 144 to the scan module(s) 132 of the scan engine(s) 130. FIG. 1 illustrates that the scan engine(s) 130 may send scan traffic data 150 for storage at the vulnerability database 118. The scan traffic data 150 may include request traffic data and response traffic data, including the request(s) 146 sent from the scan engine(s) 130 to the application(s) 142 and the associated response(s) 148 sent from the application(s) 142 to the scan engine(s) 130.

In some embodiments, the input processing component(s) 120 may be configured to receive the scan traffic data 150 stored at the vulnerability database 118 as a batch input 152. The input processing component(s) 120 may be configured to process each individual potential security vulnerability in the batch input 152, and the information associated with each individual potential security vulnerability may be provided to the confidence score prediction component(s) 122 of the ML model 112. For each of the individual potential security vulnerabilities, the confidence score prediction component(s) 122 may be configured to generate respective confidence scores associated with the individual potential security vulnerabilities. In some embodiments, each individual confidence score generated by the confidence score prediction component(s) 122 may represent, as a percentage, a likelihood that an associated potential security vulnerability is a true positive. FIG. 1 illustrates that the confidence score prediction component(s) 122 may store the resulting confidence score data 154 associated with each of the individual potential security vulnerabilities at the vulnerability database 118.

Thus, FIG. 1 illustrates that, after a scan is completed by the scan module(s) 132 on a given web application (e.g., a particular web application of the application(s) 142 hosted at the application server(s) 140), the findings may be sent in a batch to the ML model 112 which then predicts a confidence score for each finding. Such a batch approach may reduce the delay associated with producing initial scan results, in comparison to an approach that sends each individual finding to the ML model 112 separately to predict a confidence score as each individual finding is discovered. The ML model 112 may be configured to generate one confidence score per finding, which may be represented as a percentage value between zero (0) percent and one-hundred (100) percent, according to some embodiments. In such cases, a finding with a confidence score that is closer to one-hundred percent is indicative of the ML model 112 being more certain that the particular finding is a true security vulnerability (i.e., a true positive). Conversely, in such cases, a finding with a confidence score that is closer to zero percent is indicative of the ML model 112 being more certain that the particular finding is not a true security vulnerability (i.e., a false positive). The confidence scores generated by the ML model 112 may be stored in association with the corresponding findings in the vulnerability database 118, which represents a source of "truth" for findings. In some embodiments, the vulnerability database 118 may contain a field for recording the confidence scores that may be replicated to an analyst search database.

Figure 5:
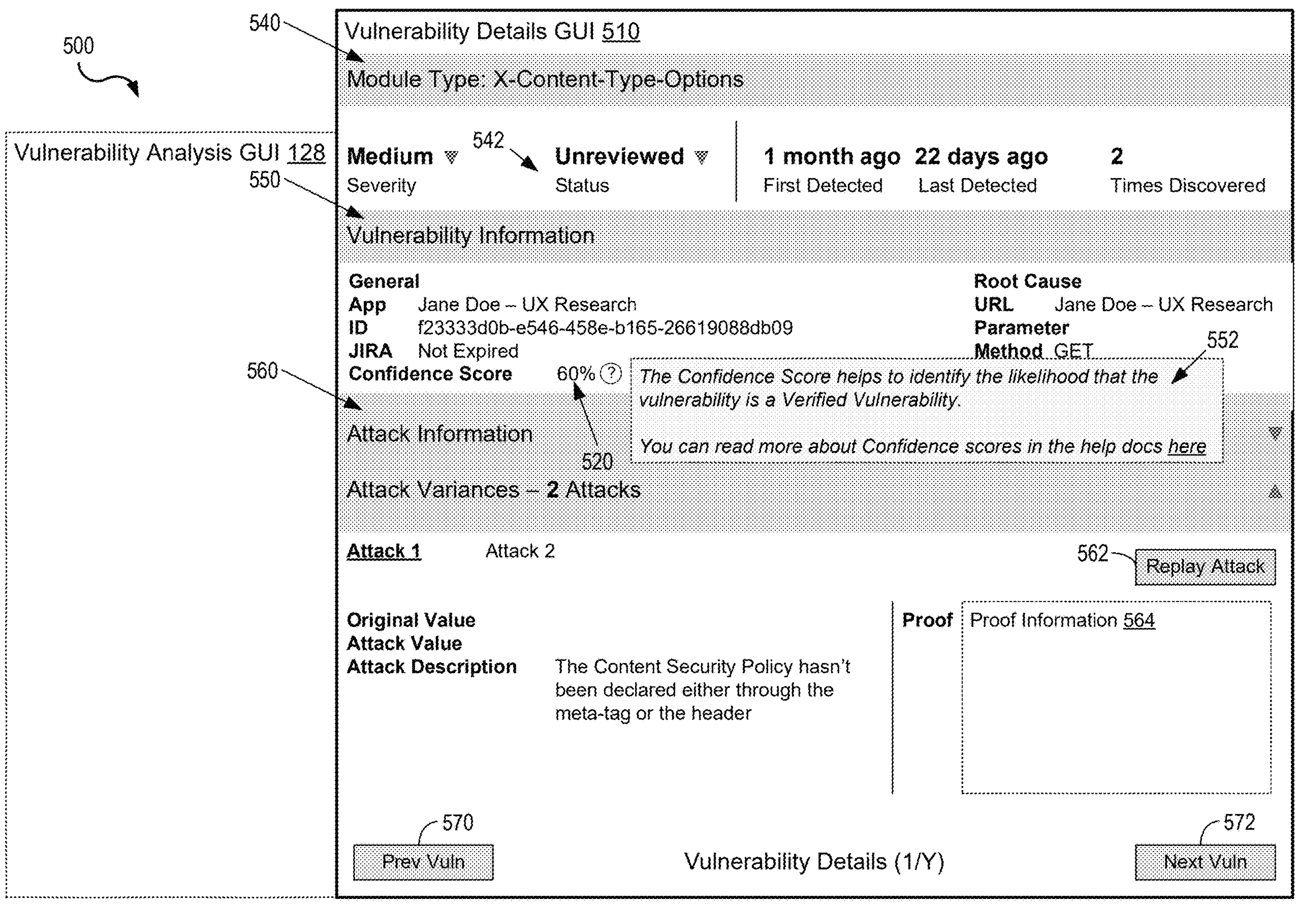
FIG. 5 is a diagram illustrating an example of a vulnerability details GUI that includes additional information regarding a confidence score calculated using the ML model for a particular potential security vulnerability, in accordance with some embodiments.
Figure 6:
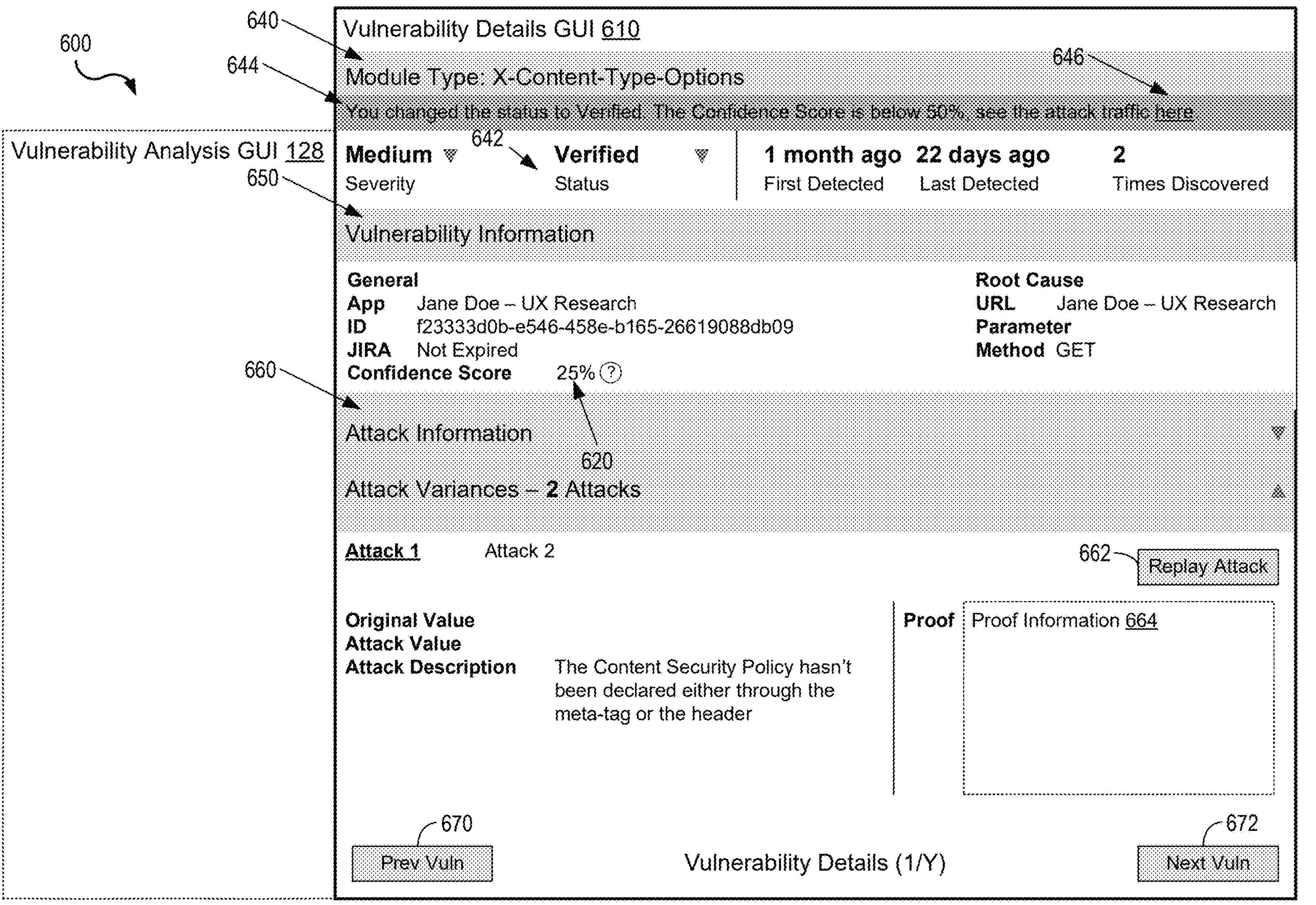
FIG. 6 is a diagram illustrating an example of a vulnerability details GUI that includes additional information that may be provided responsive to analyst feedback data that does not align with a confidence score calculated using the ML model for a particular potential security vulnerability, in accordance with some embodiments.
Figure 7:
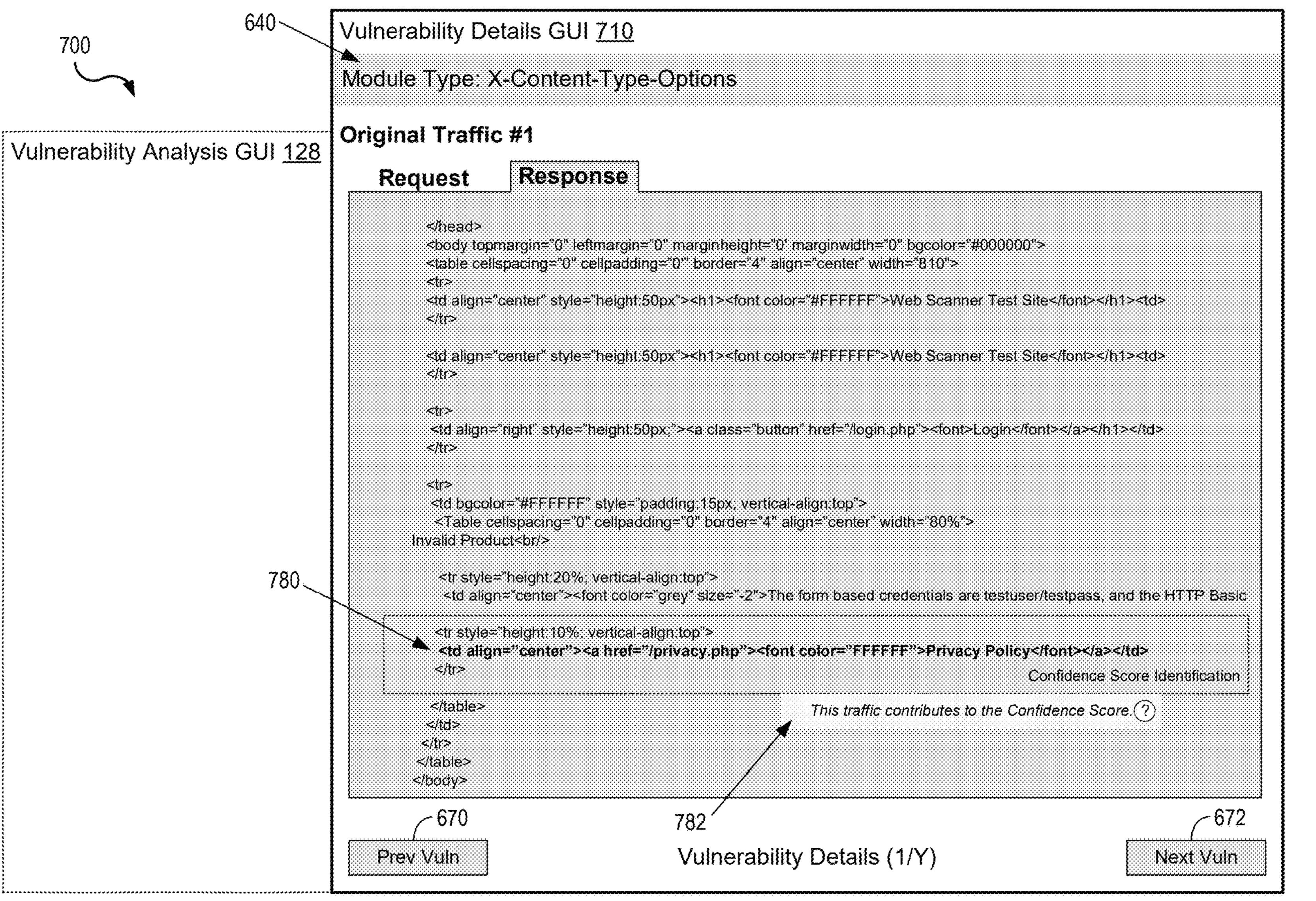
FIG. 7 is a diagram illustrating an example of a vulnerability details GUI that includes additional information regarding particular traffic that contributes to a confidence score calculated using the ML model for a particular potential security vulnerability, in accordance with some embodiments.

The GUI component(s) 126 may be configured to generate one or more GUIs, such as the vulnerability analysis GUI 128 depicted in FIG. 1 and further described herein (among other GUIs, such as the vulnerability details GUIs depicted in FIGS. 5-7). In the particular embodiment depicted in FIG. 1, the vulnerability analysis GUI 128 includes one or more search components 160, one or more sort components 162, one or more filter components 164, one or more finding review components 166, and one or more score detail components 168.

As further described herein, an analyst may utilize one or more analyst search engines 170 to retrieve information associated with a particular scan in order to review its associated findings. Accordingly, the search component(s) 160 may be configured to receive one or more scan search requests 172 from an analyst and to send the scan search request(s) 172 to the analyst search engine(s) 170. In some embodiments, the analyst search engine(s) 170 may represent a high-speed indexing enhancement to enable an analyst to more efficiently utilize the vulnerability database 118, as the vulnerability database 118 includes such a large amount of data. Responsive to receiving the scan search request(s) 172, the analyst search engine(s) 170 may be configured to generate one or more scan finding identifiers 174 and to send the scan finding identifier(s) 174 to the vulnerability database 118. FIG. 1 illustrates that, for the scan finding identifier(s) 174, associated scan finding(s) data 176 and associated confidence score(s) 180 may be communicated to the analyst search engine(s) 170. The analyst search engine(s) 170 may communicate the scan finding(s) data 176 and the associated confidence score(s) 180 for presentation to the analyst via the vulnerability analyst GUI 128.

As further described herein, the sort component(s) 162 may be configured to sort the scan finding(s) data 176 based on sort criteria provided by an analyst via the vulnerability analysis GUI 128, such as based on the confidence score(s) 180, vulnerability severity, or a combination thereof. The filter component(s) 162 may be configured to filter the scan finding(s) data 176 based on filter criteria provided by an analyst via the vulnerability analysis GUI 128, such as based on the confidence score(s) 180, vulnerability severity, or a combination thereof. As further described herein, the finding review component(s) 166 may be configured to receive analyst feedback data 190 related to the individual findings and to send the analyst feedback data 190 to the feedback processing component 124 of the ML model 112. As further described herein, the score detail component(s) 168 may be configured to generate additional information for presentation to an analyst related to how a particular confidence score was calculated by the ML model 112.

In some embodiments, as further described herein, the feedback processing component(s) 124 may be configured to utilize the analyst feedback data 190 to refine the ML model 112. For example, when the confidence score generated by the ML model 112 is indicative of a particular vulnerability as being a true positive and the analyst identifies the particular vulnerability as being a false positive (or vice versa), such information may be utilized to refine the ML model 112.

Thus, FIG. 1 illustrates an example system 100 in which the ML model 112 may be utilized for calculating confidence scores associated with potential security vulnerabilities detected via application security testing. FIG. 1 further illustrates that such confidence scores may be accessible to an analyst via the vulnerability analysis GUI 128. As illustrated and further described herein, the confidence scores may augment the analyst's decision-making process and may significantly improve efficiency and effectiveness while reducing alert fatigue.

Figure 2:
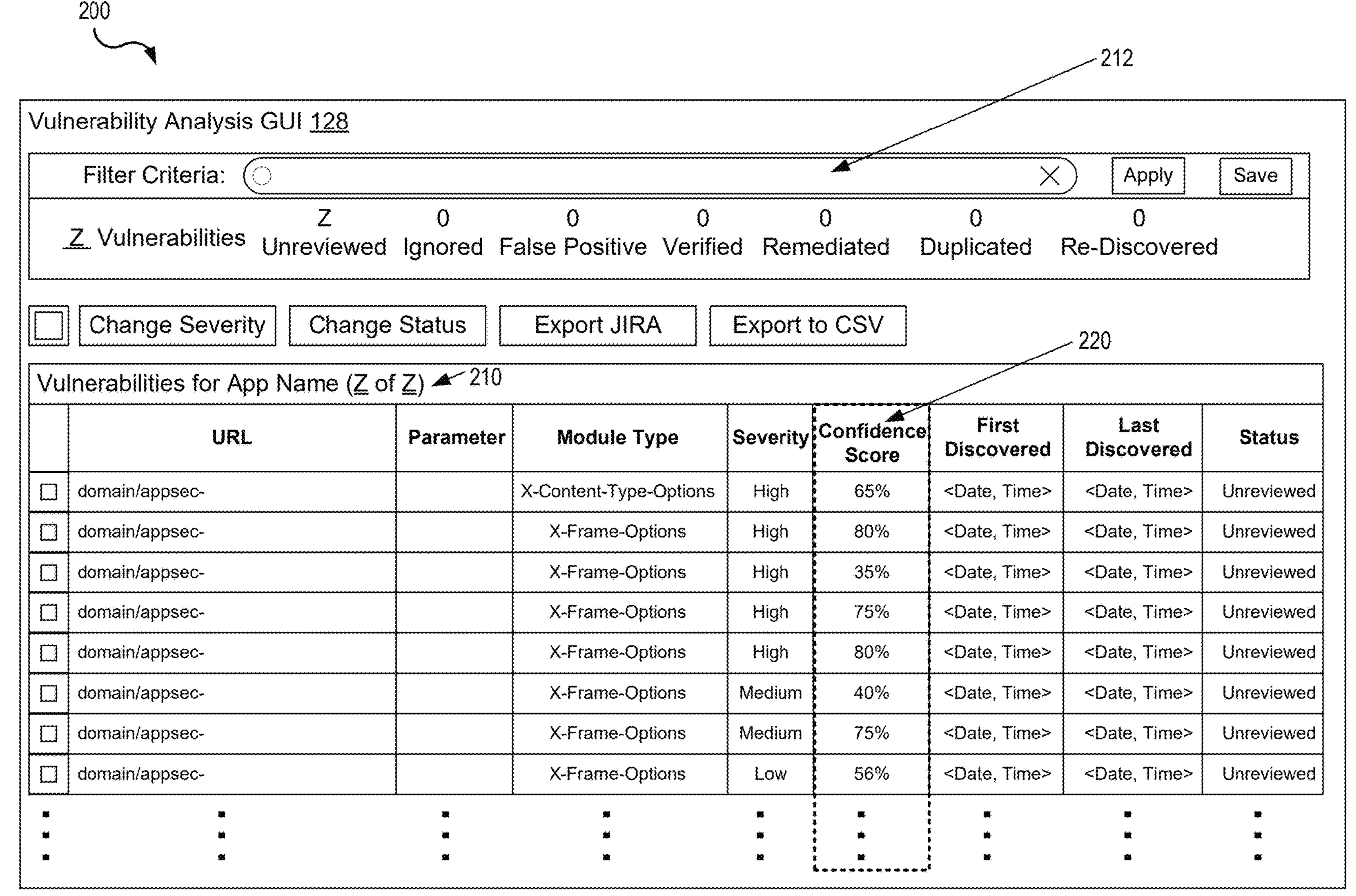
FIG. 2 is a diagram illustrating an example of a vulnerability analysis graphical user interface (GUI) that identifies potential security vulnerabilities and associated confidence scores calculated using the ML model, in accordance with some embodiments.

Referring to FIG. 2, a diagram 200 illustrates an example of the vulnerability analysis graphical user interface 128 that identifies a set of potential security vulnerabilities 210 and associated confidence scores 220 calculated using the ML model 112 of FIG. 1, in accordance with some embodiments.

Figure 4:
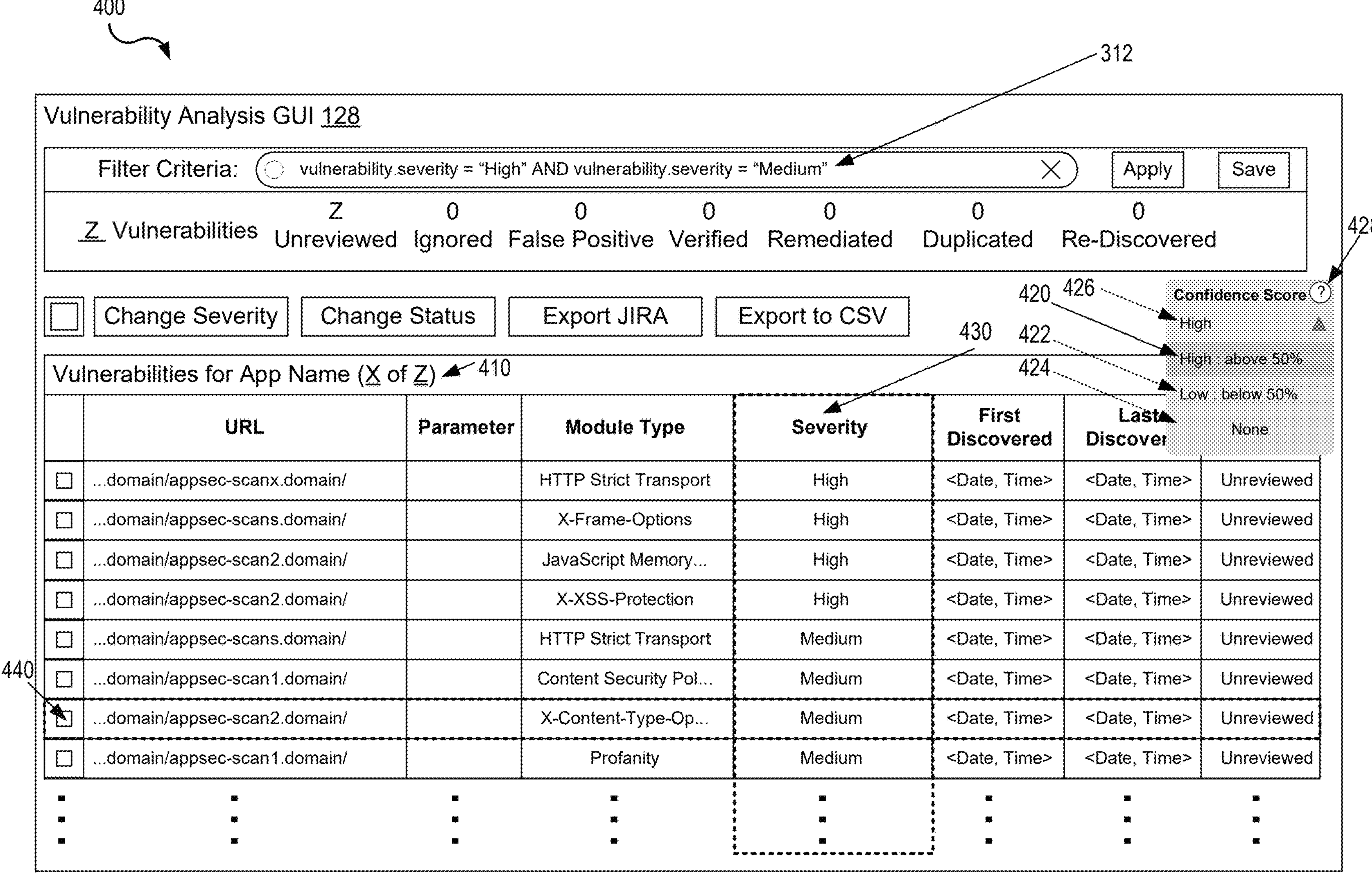
FIG. 4 is a diagram illustrating an example of a vulnerability analysis GUI that identifies potential security vulnerabilities that are sorted according to confidence scores calculated using the ML model, in accordance with some embodiments.

In the example depicted in FIG. 2, the vulnerability analysis GUI 128 lists all the potential vulnerabilities 210 (e.g., "Z of Z" vulnerabilities) and the associated confidence scores 220. At this stage, there is no ranking and/or filtering of individual vulnerabilities based on their respective confidence scores 220. FIG. 2 illustrates that a filter criteria input 212 may enable the analyst to provide such criteria in order to rank/filter the potential vulnerabilities 210. FIGS. 3 and 4 depict examples of such ranking/filtering based on example criteria provided by an analyst.

Thus, FIG. 2 illustrates an example in which the vulnerability analysis GUI 128 identifies potential security vulnerabilities and their associated confidence scores. The example depicted in FIG. 2 may represent an initial interface that is presented to an analyst prior to the analyst applying any filter criteria 212 to sort and/or filter findings based on confidence score and/or severity, according to some embodiments. In alternative embodiments, an initial graphical user interface presented to an analyst may include a set of findings that are automatically sorted and/or filtered based on confidence score and/or severity.

Referring to FIG. 3, a diagram 300 illustrates an example of a vulnerability analysis graphical user interface 128 that identifies a subset 310 of potential security vulnerabilities that are sorted according to severity 330 and associated confidence scores 320 calculated using the ML model 112 based on filter criteria 312 provided by an analyst, in accordance with some embodiments.

In the illustrative, non-limiting example depicted in FIG. 3, the filter criteria 312 provided by the analyst indicates that the analyst is interested in potential vulnerabilities having a high vulnerability severity or a medium vulnerability severity. FIG. 3 illustrates that, responsive to the filter criteria 312, the vulnerability analysis GUI 128 displays a subset 310 of potential vulnerabilities (e.g., "Y of Z" vulnerabilities in contrast to "Z of Z" vulnerabilities in FIG. 2) having a high or medium severity but excluding those with a low severity. FIG. 3 further illustrates that the subset 310 of potential vulnerabilities is ranked according to their associated confidence scores, from highest to lowest. This results in a sorted list where the findings that are deemed most likely to be real vulnerabilities (having a high/medium severity), and thus worthy of inspection first by the analyst, are at the top of the rankings. As previously described herein, this ML augmentation of the analyst's decision-making process directly enables efficiency and effectiveness gains, in contrast to a more arbitrary review process.

Thus, FIG. 3 illustrates an example in which the vulnerability analysis graphical user interface 128 identifies the subset 310 of potential security vulnerabilities that satisfy the filter criteria 312 provided by an analyst. FIG. 3 further illustrates an example in which the subset 310 of potential security vulnerabilities are sorted according to severity 330 and associated confidence scores 320 calculated using the ML model 112.

Referring to FIG. 4, a diagram 400 illustrates an example of a vulnerability analysis graphical user interface 128 that identifies a subset 410 of potential security vulnerabilities that are filtered by a confidence score threshold selected by an analyst, in accordance with some embodiments.

In the illustrative, non-limiting example depicted in FIG. 4, the filter criteria 312 provided by the analyst is the same as that of FIG. 3, indicating that the analyst is interested in potential vulnerabilities having a high vulnerability severity or a medium vulnerability severity. In contrast to FIG. 3, FIG. 4 illustrates that, in alternative embodiments, the confidence scores may be abstracted away from the user interface, with the analyst having the option to view findings filtered by a confidence score threshold (e.g., a confidence score that is greater than fifty percent). There is also an option of automatically ranking all findings by confidence score in the background before displaying the results to the analyst, such that the user interface may not present the confidence scores and instead simply present the ranking to the analyst in the first instance.

In the example depicted in FIG. 4, the analyst is presented with selectable options for filtering findings by confidence score. For example, one selectable option 420 may correspond to a first confidence score threshold (e.g., a high confidence score above fifty percent), another selectable option 422 may correspond to a second confidence score threshold (e.g., a low confidence score below fifty percent). FIG. 4 further illustrates that an alternative selectable option 424 may enable the analyst to identify vulnerabilities where confidence scores have not been generated by the ML model 112. FIG. 4 further illustrates that an alternative selectable option 426 may enable the analyst to identify vulnerabilities with an analyst-defined confidence score threshold (e.g., a high confidence score above seventy-five percent). FIG. 4 further illustrates that another selectable option 428 may enable an analyst to view further information about confidence scores.

In FIG. 4, the selectable option 420 corresponding to the first confidence threshold (e.g., above fifty percent) is highlighted in FIG. 4 as the particular option that has been selected by the analyst. FIG. 4 illustrates that, responsive to the filter criteria 312 and the analyst selection of the selectable option 420 for the confidence score threshold above fifty percent, the vulnerability analysis GUI 128 displays a subset 410 of potential vulnerabilities (e.g., "X of Z" vulnerabilities in contrast to "Y of Z" vulnerabilities in FIG. 3). As with the subset 310 of vulnerabilities in FIG. 3, the subset 410 of vulnerabilities in FIG. 4 also have a high or medium severity 430 (but not a low severity). In contrast to the subset 310 of vulnerabilities in FIG. 3, the subset 410 of vulnerabilities in FIG. 4 only includes those vulnerabilities that satisfy the first confidence threshold (e.g., above fifty percent) associated with the particular selectable option 420 selected by the analyst.

For illustrative purposes, dashed lines are used to identify a particular row associated with a particular potential security vulnerability 440 of the potential security vulnerabilities identified via the vulnerability analysis GUI 128 in FIG. 4. As further described herein, FIG. 5 depicts an example of a vulnerability details GUI 510 that may be generated responsive to selection of the particular potential security vulnerability 440 via the vulnerability analysis GUI 128 depicted in FIG. 4.

Thus, FIG. 4 illustrates an example in which the vulnerability analysis graphical user interface 128 identifies the subset 410 of potential security vulnerabilities that satisfy the filter criteria 312 provided by an analyst. FIG. 4 further illustrates an example in which the subset 410 of potential security vulnerabilities satisfy the first confidence threshold (e.g., above fifty percent) associated with the particular selectable option 420 selected by the analyst.

Referring to FIG. 5, a diagram 500 illustrates an example of a vulnerability details GUI 510 that includes additional information regarding a confidence score calculated using the ML model 112 of FIG. 1 for a particular potential security vulnerability, in accordance with some embodiments. To illustrate, an analyst may select the particular potential security vulnerability 440 of the potential security vulnerabilities identified via the vulnerability analysis GUI 128 in FIG. 4, and the vulnerability details GUI 510 depicted in FIG. 5 may be displayed in response.

FIG. 5 illustrates an example in which the vulnerability details GUI 510 displays a module type identifier 540 for the analyst-selected vulnerability (e.g., a "X-Content-Type-Options" module type). FIG. 5 further illustrates that the vulnerability details GUI 510 may enable the analyst to perform one or more actions, such as changing a status 542 from an unreviewed status to a true positive (e.g., "Verified" or "Reviewed") or to a false positive (e.g., "Unverified"). In the example depicted in FIG. 5, the status 542 remains in a default state of "Unreviewed" (i.e., the analyst has not yet provided her feedback).

FIG. 5 further illustrates that the vulnerability details GUI 510 includes vulnerability information 550 associated with the analyst-selected vulnerability. In the example depicted in FIG. 5, adjacent to a confidence score 520, additional confidence score information 552 may be displayed for the analyst (such as in response to the analyst selecting or hovering over a question-mark icon). In the particular embodiment depicted in FIG. 5, the additional confidence score information 552 indicates to the analyst that the confidence score 520 helps to identify the likelihood that the vulnerability is a Verified Vulnerability and provides the analyst with a hyperlink to read more about confidence scores.

FIG. 5 further illustrates that the vulnerability details GUI 510 also includes attack information 560 associated with the analyst-selected vulnerability. In the example depicted in FIG. 5, the attack information 560 includes a replay attack selectable option 562 that enables the analyst to replay a particular attack. Additionally, in the example depicted in FIG. 5, the attack information 560 includes proof information 564 which may identify a result of a particular regular expression (e.g., a true positive or a false positive). FIG. 5 further illustrates that the vulnerability details GUI 510 also includes a previous vulnerability selectable option 570 and a next vulnerability selectable option 572 that enables the analyst to view vulnerability details for previous and next vulnerabilities, respectively.

Thus, the vulnerability details GUI 510 depicted in FIG. 5 represents example information that may be presented to an analyst responsive to selecting a particular potential security vulnerability via the vulnerability analysis GUI 128 (as depicted in FIG. 4). The example information presented in FIG. 5 may enable the analyst to determine what is interesting about this particular vulnerability, what is the type of vulnerability, when was the vulnerability first discovered, etc. in addition to presenting the confidence score 520 as calculated by the ML model 112 of FIG. 1. Further, the vulnerability details GUI 510 depicted in FIG. 5 may enable the analyst to examine actual traffic data, which is where the analyst may utilize her expert knowledge to distinguish between a true positive and a false positive.

Referring to FIG. 6, a diagram 600 illustrates an example of a vulnerability details GUI 610 that includes additional information that may be provided responsive to analyst feedback data that does not align with a confidence score calculated using the ML model for a particular potential security vulnerability, in accordance with some embodiments.

As with the vulnerability details GUI 510 of FIG. 5, the vulnerability details GUI 610 of FIG. 6 displays a module type identifier 640 for the analyst-selected vulnerability (e.g., a "X-Content-Type-Options" module type). In contrast to the example depicted in FIG. 5, FIG. 6 illustrates that the analyst has changed a status 642 from an unreviewed status to a true positive (e.g., "Verified") in this case. As with the vulnerability details GUI 510 of FIG. 5, the vulnerability details GUI 610 of FIG. 6 includes vulnerability information 650 associated with the particular analyst-selected vulnerability, including a confidence score 620.

As with the vulnerability details GUI 510 of FIG. 5, the vulnerability details GUI 610 of FIG. 6 also includes attack information 660 associated with the analyst-selected vulnerability. In the example depicted in FIG. 6, the attack information 660 includes a replay attack selectable option 662 that enables the analyst to replay a particular attack. Additionally, in the example depicted in FIG. 6, the attack information 660 includes proof information 664 which may identify a result of a particular regular expression (e.g., a true positive or a false positive). FIG. 6 further illustrates that the vulnerability details GUI 610 also includes a previous vulnerability selectable option 670 and a next vulnerability selectable option 672 that enables the analyst to view vulnerability details for previous and next vulnerabilities, respectively.

In contrast to the confidence score 520 depicted in FIG. 5 which is sixty percent and thereby indicative of a true positive prediction from the ML model 112, the confidence score 620 depicted in FIG. 6 is only twenty-five percent and thereby indicative of a false positive prediction from the ML model 112. Accordingly, responsive to the analyst changing the status 642 to a verified true positive vulnerability, FIG. 6 illustrates that an alert 644 is displayed which includes information to notify the analyst that the confidence score 620 (which was generated by the ML model 112) is indicative of a false positive vulnerability. The alert 644 may serve to reduce analyst error in case of misclassification but also to help improve the ML model 112 where it under-performs, as described further herein. FIG. 6 illustrates that, in some embodiments, the alert 644 may include a link 646 to a different user interface that highlights the web traffic that the ML model 112 deems to contribute most to the confidence score (see e.g., FIG. 7).

Thus, the example vulnerability details GUI 610 depicted in FIG. 6 is designed to illustrate a case in which an analyst's conclusion does not align with the prediction based on the confidence score 620 from the ML model 112. If the analyst's conclusion is correct, the status 642 may be included in the analyst feedback data 190 which may represent more training data for the model training component(s) 114 in order to improve the ML model 112, as illustrated and described herein with respect to FIG. 1.

Referring to FIG. 7, a diagram 700 illustrates an example of a vulnerability details GUI 710 that includes additional information regarding particular traffic that contributes to a confidence score calculated using the ML model 112 of FIG. 1 for a particular potential security vulnerability, in accordance with some embodiments. In some embodiments, the traffic information depicted in the example vulnerability details GUI 710 of FIG. 7 may be displayed responsive to an analyst selecting the link 646 included in the alert 644 in FIG. 6.

The example vulnerability details GUI 710 depicted in FIG. 7 includes a confidence score identification 780 (represented by dashed lines) to highlight particular web traffic that the ML model 112 deems to contribute most to a confidence score (e.g., the confidence score 620 of FIG. 6) as well as a text notification 782 to inform the analyst that this traffic contributes to the confidence score. In some cases, based on such information, the analyst may elect to conduct the review again and may elect to change the status. Additionally, while not shown in the example of FIG. 7, in some embodiments, a user interface may include an input field that may provide the analyst with the opportunity to submit further reasoning for her decision.

As described further herein, by taking this scenario into account, there may be scope to improve the ML model 112 over time for certain types of findings where it may under-perform and the predicted confidence score is not accurate. To mitigate this, the ML model 112 can be actively re-trained or fine-tuned via a feedback loop. Findings where the analyst's choice of status does not correlate with the confidence score may be automatically stored for manual review, according to some embodiments. Once the status for each of these findings is reviewed again, and if there is a satisfactory number of findings for the machine learning training process, this new data can be used to fine-tune the ML model 112 and to improve its performance, according to some embodiments. This could occur, for example, on a weekly, fortnightly, or monthly basis. These findings may also be added to the original dataset stored at the vulnerability database 118 and a new model may be trained from scratch.

Thus, FIG. 7 illustrates an example in which the vulnerability details GUI 710 includes additional information regarding particular traffic that contributes to a confidence score calculated using the ML model 112 of FIG. 1 for a particular potential security vulnerability. In some embodiments, the traffic information depicted in the example vulnerability details GUI 710 of FIG. 7 may be displayed responsive to an analyst selecting the link 646 included in the alert 644 in FIG. 6 in order to highlight for the analyst the particular web traffic that the ML model 112 deems to contribute most to the confidence score. The highlighted web traffic may serve to reduce analyst error in case of misclassification but also to help improve the ML model 112 where it under-performs.

FIG. 8 is a flowchart 800 that illustrates an example process of utilizing a machine learning model for calculating confidence scores associated with potential security vulnerabilities detected via application security testing, according to some embodiments.

At operation 810, the process includes obtaining scan traffic data associated with one or more potential security vulnerabilities detected via one or more scan engines that implement application security testing. For example, referring to FIG. 1, the scan engine(s) 130 that implement application security testing may obtain the scan traffic data 150 associated with one or more potential security vulnerabilities associated with the application(s) 142.

At operation 820, the process includes determining, using a ML model for calculating confidence scores associated with potential security vulnerabilities detected via application security testing, respective confidence scores for each of the individual potential security vulnerabilities. The ML model is trained using vulnerability data associated with a set of previously identified vulnerabilities. The vulnerability data indicates, for each respective previously identified vulnerability of the set of previously identified vulnerabilities, whether the previously identified vulnerability is a true positive or a false positive. For example, referring to FIG. 1, the model training component(s) 114 may utilize the vulnerability data 116 from the vulnerability database 118 to train the ML model 112. The input processing component(s) 120 may process the batch input 152 (associated with the scan traffic data 150), and the confidence score prediction component(s) 122 may generate the confidence score data 154 for storage at the vulnerability database 118.

At operation 830, the process includes displaying the respective confidence scores via a vulnerability analysis GUI responsive to a request for scan findings associated with a particular application. For example, referring to FIG. 1, the GUI component(s) 126 may generate the vulnerability analysis GUI 128, and the vulnerability analysis GUI 128 may display the scan finding(s) data 176 and associated confidence score(s) 180 responsive to receiving the scan search request(s) 172 from an analyst. Additional details regarding example information that may be displayed via the vulnerability analysis GUI 128 is illustrated and further described herein with respect to FIGS. 2-7.

Thus, FIG. 8 illustrates an example of a process of utilizing a machine learning model for calculating confidence scores associated with potential security vulnerabilities detected via application security testing.

Figure 9:
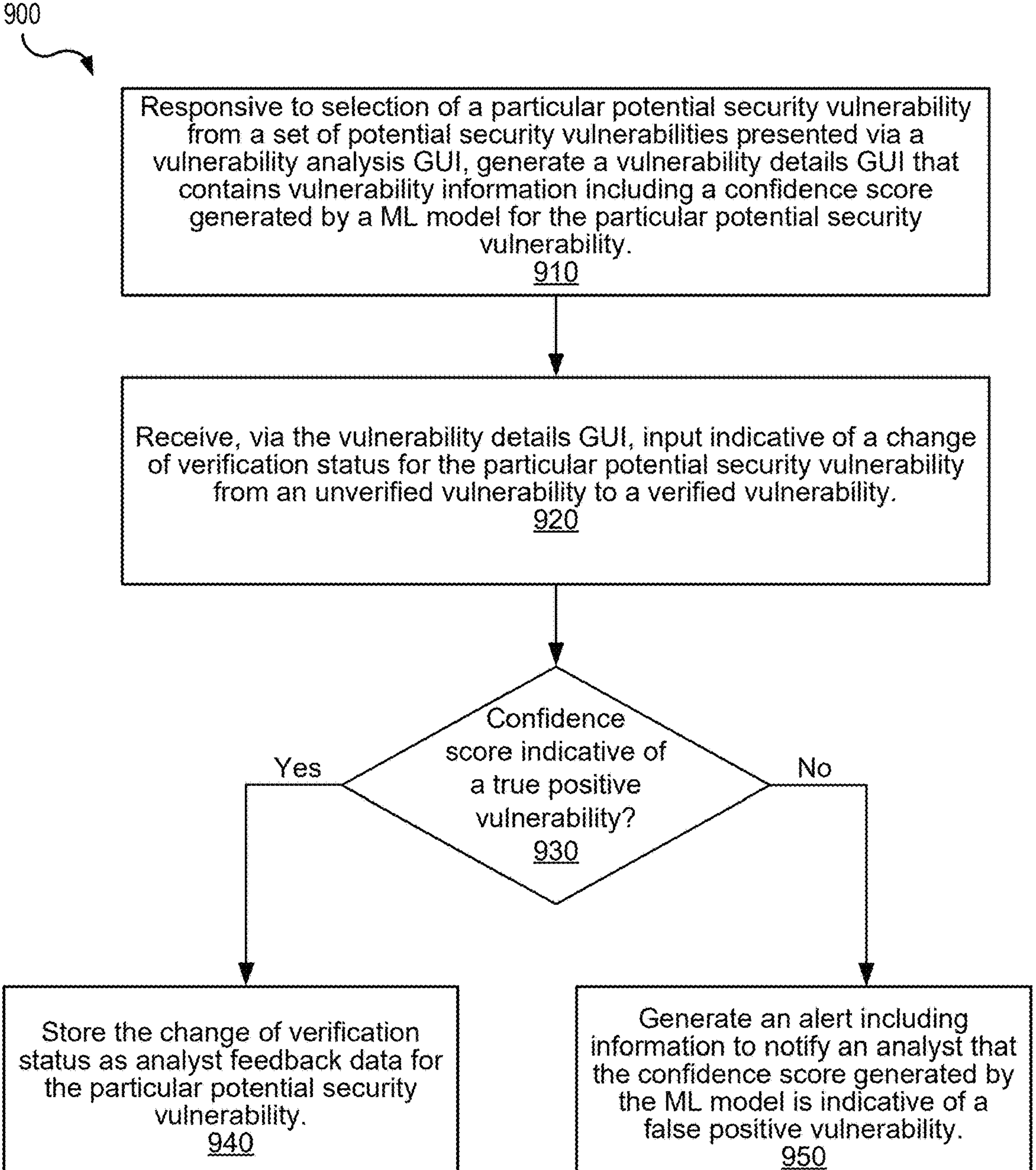
FIG. 9 is a flowchart that illustrates an example process of generating a notification in response to analyst feedback data that does not align with a confidence score calculated using the ML model for a particular potential security vulnerability, according to some embodiments.

FIG. 9 is a flowchart 900 that illustrates an example process of generating an alert in response to analyst feedback data that does not align with a confidence score calculated using the ML model for a particular potential security vulnerability, according to some embodiments.

At operation 910, the process includes generating a vulnerability details GUI responsive to selection of a particular potential security vulnerability from a set of potential security vulnerabilities presented via a vulnerability analysis GUI. The vulnerability details GUI contains vulnerability information including a confidence score generated by a ML model for the particular potential security vulnerability. For example, referring to FIG. 5, the vulnerability details GUI 510 may be generated responsive to selection of the particular potential security vulnerability 440 from the set of potential security vulnerabilities presented via the vulnerability analysis GUI 128 depicted in FIG. 4.

At operation 920, the process includes receiving, via the vulnerability details GUI, input indicative of a change of status associated with the particular potential security vulnerability from an unverified vulnerability to a verified vulnerability. For example, referring to FIG. 6, the vulnerability details GUI 610 may be generated responsive to an analyst having changed the status 642 from an unreviewed status to a true positive (e.g., "Verified").

At operation 930, the process includes determining whether the confidence score associated with the particular potential security vulnerability is indicative of a true positive vulnerability. For example, in the example depicted in FIG. 6, the confidence score 620 associated with the particular analyst-selected vulnerability is twenty-five percent, which is not indicative of a true positive vulnerability.

If, at operation 930, the confidence score is determined to be indicative of a true positive vulnerability, the process proceeds to operation 940. At operation 940, the process includes storing the change of status as analyst feedback data for the particular potential security vulnerability. For example, FIG. 1 illustrates that the finding review component(s) 166 of the vulnerability analysis GUI 128 may include the change of status as part of the analyst feedback data 190 that is sent to the feedback processing component (s) 124 of the ML model 112.

If, at operation 930, the confidence score is not determined to be indicative of a true positive vulnerability, the process proceeds to operation 950. At operation 950, the process includes generating an alert including information to notify an analyst that the confidence score generated by the ML model is indictive of a false positive vulnerability. For example, the confidence score 620 depicted in FIG. 6 is only twenty-five percent and thereby indicative of a false positive prediction from the ML model 112. Accordingly, responsive to the analyst changing the status 642 to a verified true positive vulnerability, FIG. 6 illustrates that the alert 644 that is generated includes information to notify the analyst that the confidence score 620 (which was generated by the ML model 112) is indicative of a false positive vulnerability. FIG. 6 further illustrates that, in some embodiments, the alert 644 may include the link 646 to a different user interface that highlights the web traffic that the ML model 112 deems to contribute most to the confidence score (see e.g., FIG. 7).

Thus, FIG. 9 illustrates an example process of generating an alert in response to analyst feedback data that does not align with a confidence score calculated using the ML model for a particular potential security vulnerability. The alert may serve to reduce analyst error in case of misclassification but may also to help improve the ML model 112 where it under-performs, as described further herein.

Figure 10:
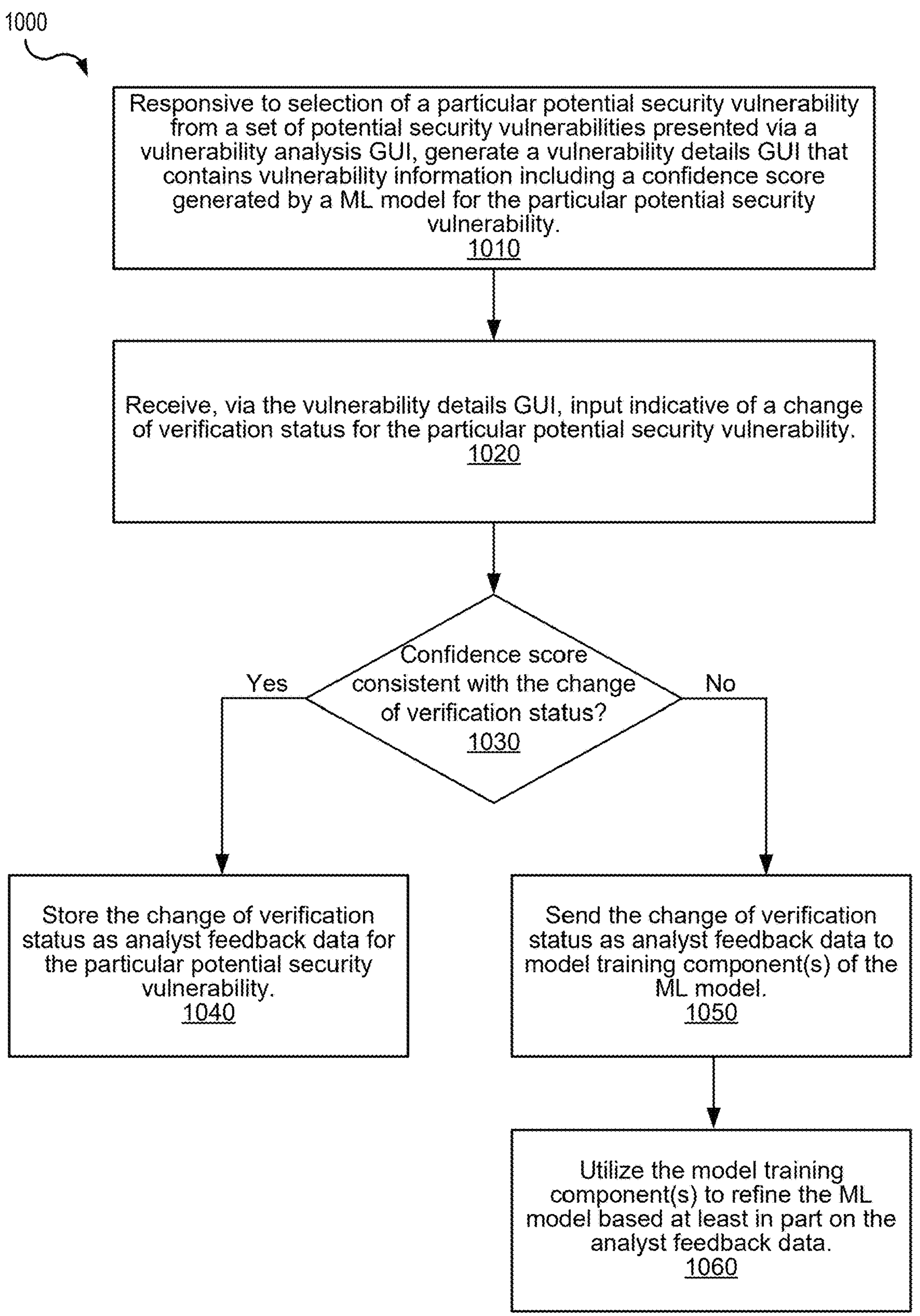
FIG. 10 is a flowchart that illustrates an example process of utilizing analyst feedback data to refine the ML model for calculating confidence scores associated with potential security vulnerabilities detected via application security testing, according to some embodiments.

FIG. 10 is a flowchart 1000 that illustrates an example process of utilizing analyst feedback data to refine the ML model for calculating confidence scores associated with potential security vulnerabilities detected via application security testing, according to some embodiments.

At operation 1010, the process includes generating a vulnerability details GUI responsive to selection of a particular potential security vulnerability from a set of potential security vulnerabilities presented via a vulnerability analysis GUI. The vulnerability details GUI contains vulnerability information including a confidence score generated by a ML model for the particular potential security vulnerability. For example, referring to FIG. 5, the vulnerability details GUI 510 may be generated responsive to selection of the particular potential security vulnerability 440 from the set of potential security vulnerabilities presented via the vulnerability analysis GUI 128 depicted in FIG. 4.

At operation 1020, the process includes receiving, via the vulnerability details GUI, input indicative of a change of verification status for the particular potential security vulnerability. For example, referring to FIG. 6, the vulnerability details GUI 610 may be generated responsive to an analyst having changed the status 642 from an unreviewed status to a true positive (e.g., "Verified").

At operation 1030, the process includes determining whether the confidence score generated by the ML model is consistent with the change of verification status. For example, in the example depicted in FIG. 6, the confidence score 620 associated with the particular analyst-selected vulnerability is twenty-five percent, which is not indicative of a true positive vulnerability. Accordingly, in this case, the confidence score 620 generated by the ML model 112 is not consistent with the status 642 being changed from the unreviewed status to a true positive (e.g., "Verified").

If, at operation 1030, the confidence score is determined to be consistent with the change of verification status, the process proceeds to operation 1040. At operation 1040, the process includes storing the change of status as analyst feedback data for the particular potential security vulnerability. For example, FIG. 1 illustrates that the finding review component(s) 166 of the vulnerability analysis GUI 128 may include the change of status as part of the analyst feedback data 190 that is sent to the feedback processing component(s) 124 of the ML model 112.

If, at operation 1030, the confidence score is not determined to be consistent with the change of verification status, the process proceeds to operation 1050. At operation 1050, the process includes sending the change of verification status to one or more model training components of the ML model. To illustrate, for the example depicted in FIG. 6 where the analyst changed the status 642 from an unreviewed status to a true positive (e.g., "Verified"), FIG. 1 illustrates that the feedback processing component(s) 124 may send the status 642 as part of the analyst feedback data 190 that is provided to the model training component(s) 114 of the ML model 112.

At operation 1060, the process may include utilizing the model training component(s) to refine the ML model based at least in part on the analyst feedback data. For example, referring to FIG. 1, the model training component(s) 114 may be utilized to refine the ML model 112 based at least in part on the analyst feedback data 190.

Thus, FIG. 10 illustrates an example process of utilizing analyst feedback data to refine the ML model 112 for calculating confidence scores associated with potential security vulnerabilities detected via application security testing. In cases where the analyst's classification does not align with the prediction of the ML model 112, this information may be utilized to help improve the ML model 112 where it under-performs.

FIG. 11 through FIG. 14 illustrate that the confidence scores generated by the ML model 112 of the present disclosure may be used for other tasks. As an example, the confidence scores may be used for monitoring false positive levels for different scan modules for various attack types, as illustrated and further described herein with respect to FIG. 11. As another example, as illustrated and further described herein with respect to FIG. 12, the confidence scores may be used for further ranking of findings, whereby the severity of the finding and the confidence score are used in combination to produce an overall ranking metric. As yet another example, the confidence scores may be used for bulk false positive labeling of findings, as illustrated and further described herein with respect to FIG. 13. As yet another example, the confidence scores may be used to streamline follow-up and remediation scans, as illustrated and further described herein with respect to FIG. 14. It will be appreciated that the confidence scores generated by the ML model 112 of the present disclosure may be used for various other alternative tasks.

Figure 11:
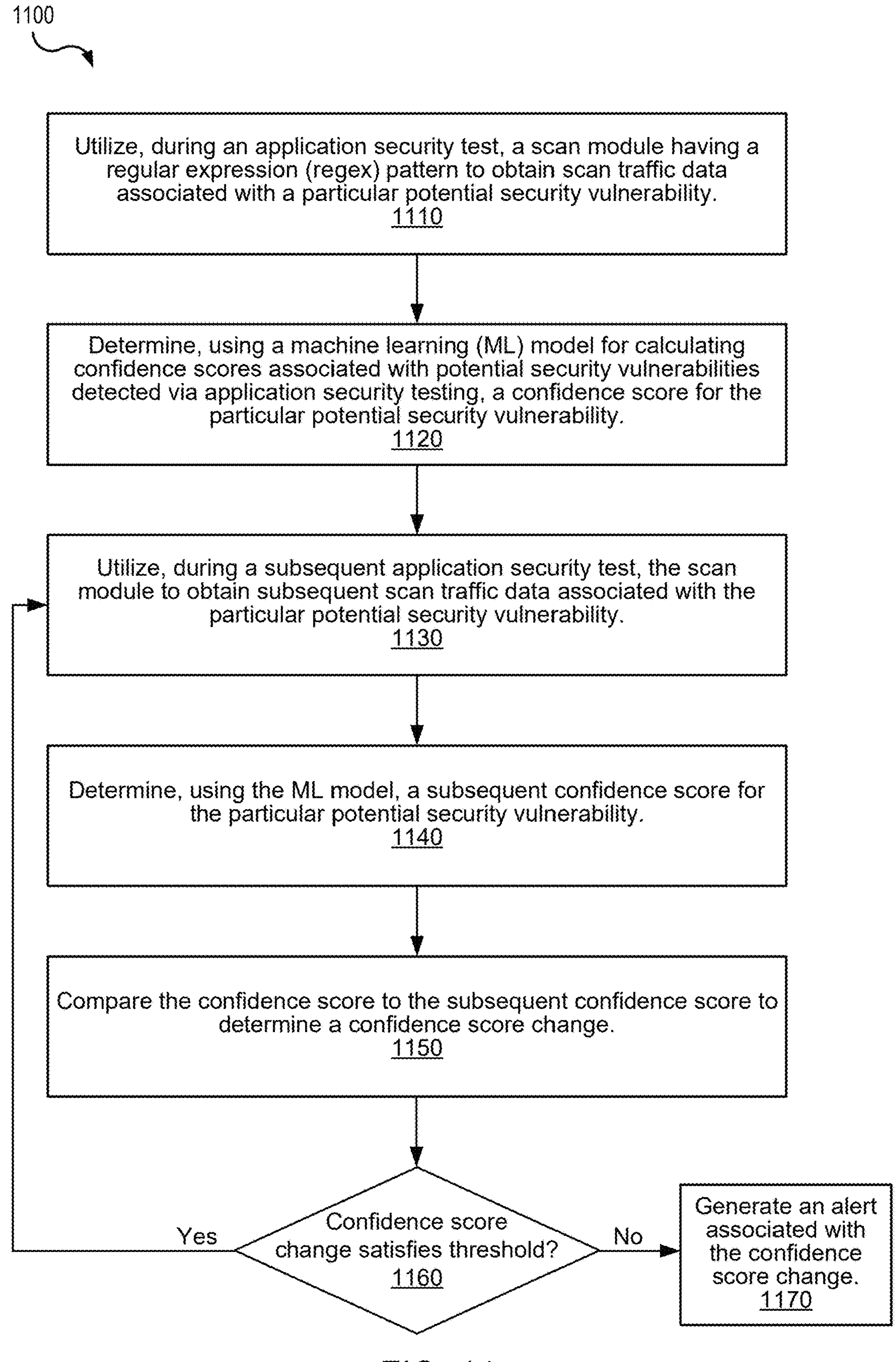
FIG. 11 is a flowchart that illustrates an example process of monitoring confidence scores calculated using the ML model over time, according to some embodiments.

Referring to FIG. 11, a flowchart 1100 illustrates an example process of monitoring confidence scores calculated using the ML model over time, according to some embodiments.

At operation 1110, the process includes utilizing, during an application security test, a scan module having a regular expression (regex) pattern to obtain scan traffic data associated with a particular potential security vulnerability. For example, referring to FIG. 1, during an application security test of the application(s) 142, a particular scan module of the one or more scan modules 132 may be utilized that has a particular regex pattern to obtain at least a portion of the scan traffic data 150 that is associated with a particular potential security vulnerability.

At operation 1120, the process includes determining, using a ML model for calculating confidence scores associated with potential security vulnerabilities detected via application security testing, a confidence score for the particular potential security vulnerability. For example, referring to FIG. 1, the confidence score prediction component(s) 122 of the ML model 112 may generate the confidence score data 154 based on the scan traffic data 150. The confidence score for the particular potential security vulnerability may correspond to a particular confidence score of the confidence score(s) 180 presented to an analyst via the vulnerability analysis GUI 128.

At operation, 1130, the process includes utilizing, during a subsequent application security test, the scan module to obtain subsequent scan traffic data associated with the particular potential security vulnerability. For example, referring to FIG. 1, during a subsequent application security test of the application(s) 142, the particular scan module (having the particular regex pattern) of the one or more scan modules 132 may be utilized to obtain at least a portion of subsequent scan traffic data 150 that is associated with the particular potential security vulnerability.

At operation 1140, the process includes determining, using the ML model, a subsequent confidence score for the particular potential security vulnerability. For example, referring to FIG. 1, the confidence score prediction component(s) 122 of the ML model 112 may generate subsequent confidence score data 154 based on subsequent scan traffic data 150. A subsequent confidence score for the particular potential security vulnerability may correspond to a particular subsequent confidence score of the subsequent confidence score(s) 180 presented to an analyst via the vulnerability analysis GUI 128.

At operation 1150, the process includes comparing the confidence score to the subsequent confidence score to determine a confidence score change. For example, the confidence score prediction component(s) 122 may compare the confidence score (associated with the initial application security test) to the subsequent confidence score (associated with the subsequent application security test) to determine the confidence score change.

At operation 1160, the process includes determining whether the confidence score change satisfies a threshold. For example, while not shown in FIG. 1, the ML model 112 and/or the vulnerability database 118 may store one or more thresholds for confidence score changes, and the confidence score prediction component(s) 122 may be utilized to determine whether the confidence score change satisfies the threshold.

If the confidence score change satisfies the threshold at operation 1160, the process returns to operation 1130, where the scan module is utilized to obtain next scan traffic data. If the confidence score change does not satisfy the threshold at operation 1160, the process proceeds to operation 1170. At operation 1170, the process includes generating an alert associated with the confidence score change. For example, while not shown, the alert may be presented via the vulnerability analysis GUI 128 depicted in FIGS. 1-4 and/or via the vulnerability details GUIs 510, 610, 710 depicted in FIGS. 5-7, among other alternatives.

The process described with respect to FIG. 11 may be useful for monitoring false positive levels per module. For example, referring to FIG. 1, the scan engine(s) 130 may have approximately one-hundred different scan modules 132 for various attack types. Each scan module(s) 132 uses a particular regular expression (regex) for initial pattern matching based on web traffic. However, these may be vulnerable to drift over time where attacks change or become outdated, but the regex pattern matching is not reviewed at the same time. In some cases, this can lead to an increase in false positives for the scan module(s) 132. FIG. 11 illustrates that the confidence scores generated by the ML model 112 can be used to monitor performance of each of the scan module(s) 132, whereby if an average confidence score over a time-windowed set of potential findings drops below a certain threshold, then the development team can be informed to review the initial regex step with the aim of improving its pattern matching. Further, the ML model 112 can be reviewed for re-training or fine-tuning.

Thus, FIG. 11 illustrates that the confidence scores generated by the ML model 112 of the present disclosure may be used for monitoring false positive levels for different scan modules for various attack types. Monitoring confidence scores over time may be useful for identifying problems such as data drift or concept drift or identifying vulnerabilities changing in terms of how they are exploited (so the traffic may be different).

Referring to FIG. 12, a flowchart 1200 illustrates an example process of utilizing confidence scores calculated using the ML model in combination with one or more other metrics to produce an overall score, according to some embodiments.

At operation 1210, the process includes obtaining scan traffic data associated with a particular potential security vulnerability detected via one or more scan engines that implement application security testing. For example, referring to FIG. 1, the one or more scan engines 130 that implement application security testing may be utilized to obtain the scan traffic data 150 associated with a particular potential security vulnerability.

At operation 1220, the process includes determining, using a ML model for calculating confidence scores associated with potential security vulnerabilities detected via application security testing, a confidence score for the particular potential security vulnerability. For example, referring to FIG. 1, the confidence score prediction component(s) 122 of the ML model 112 may generate the confidence score data 154 based on the scan traffic data 150. The confidence score for the particular potential security vulnerability may correspond to a particular confidence score of the confidence score(s) 180 presented to an analyst via the vulnerability analysis GUI 128.

At operation 1230, the process includes determining a vulnerability severity associated with the particular potential security vulnerability. For example, referring to FIG. 1, the ML model 112 may determine that the vulnerability severity associated with the particular potential security vulnerability is one of: a high vulnerability severity; a medium vulnerability severity; or a low vulnerability severity. The example information presented in the vulnerability analysis GUI 128 depicted in FIGS. 2-4 shows various examples of such vulnerability severities associated with different potential security vulnerabilities.

At operation 1240, the process includes determining, based on a combination of the confidence score and the vulnerability severity, an overall ranking metric associated with the particular potential security vulnerability. For example, referring to FIG. 1, the ML model 112 may generate an overall ranking metric associated with the particular potential security vulnerability based on a combination of the confidence score and the vulnerability severity. As an illustrative example, such an overall ranking metric may be particularly useful for high severity vulnerabilities with relatively ambiguous confidence scores at or near fifty percent (i.e., where the ML model 112 is relatively uncertain as to TP or FP prediction). It may be advantageous to review such types of potential security vulnerabilities before other vulnerabilities which may have a higher confidence score but that have a lower relative severity.

Thus, FIG. 12 illustrates that the confidence scores generated by the ML model 112 of the present disclosure may be used for further ranking of findings, whereby the severity of the finding and the confidence score are used in combination to produce an overall ranking metric.

Figure 13:
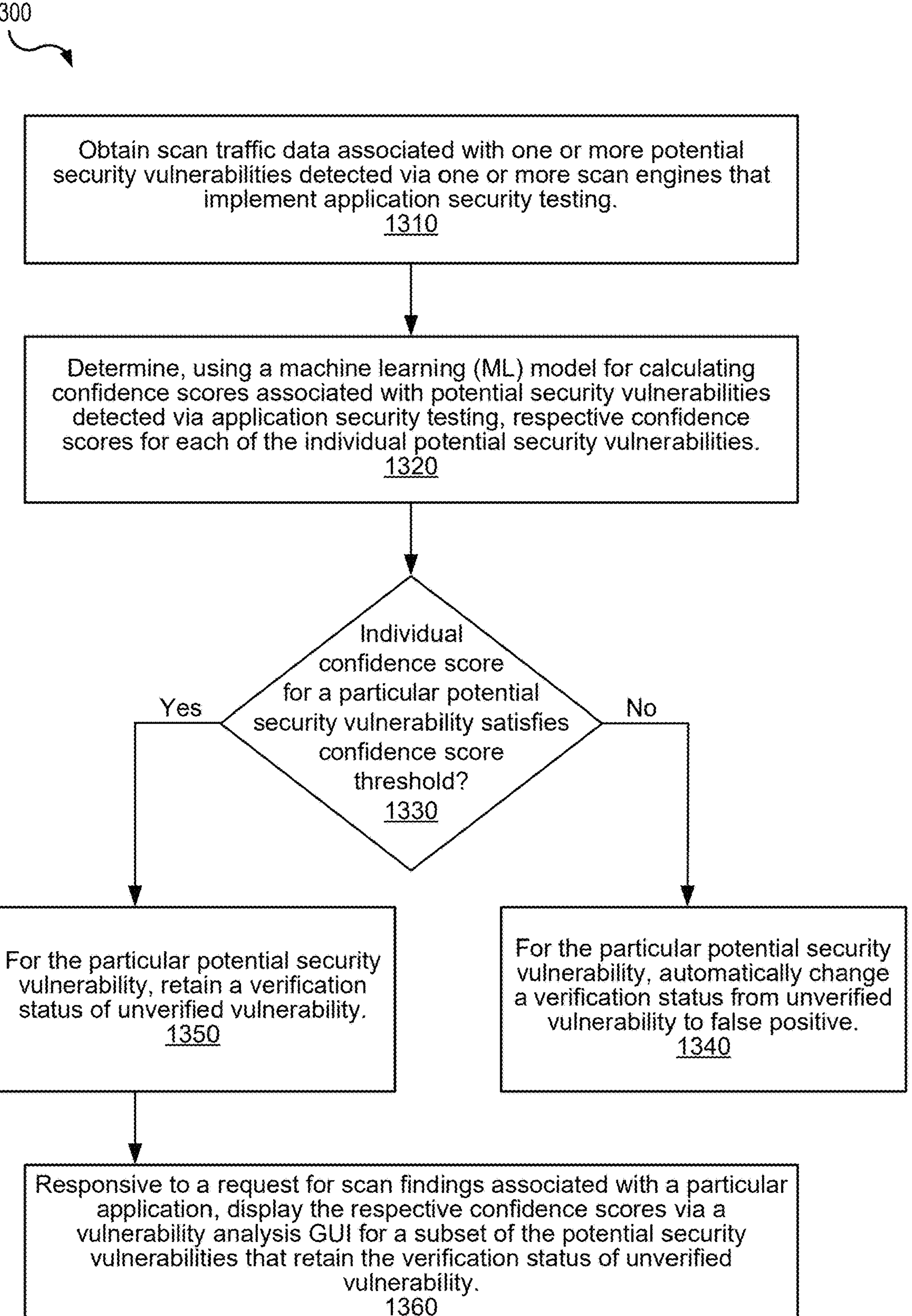
FIG. 13 is a flowchart that illustrates an example process of utilizing a ML model for bulk false positive labeling of potential security vulnerabilities having calculated confidence scores that do not satisfy a confidence score threshold, according to some embodiments.

FIG. 13 is a flowchart 1300 that illustrates an example process of utilizing a ML model for bulk false positive labeling of potential security vulnerabilities having calculated confidence scores that do not satisfy a confidence score threshold, according to some embodiments.

At operation 1310, the process includes obtaining scan traffic data associated with one or more potential security vulnerabilities detected via one or more scan engines that implement application security testing. For example, referring to FIG. 1, the one or more scan engines 130 that implement application security testing may be utilized to obtain the scan traffic data 150 associated with one or more potential security vulnerabilities.

At operation 1320, the process includes determining, using a ML model for calculating confidence scores associated with potential security vulnerabilities detected via application security testing, respective confidence scores for each of the individual potential security vulnerabilities. For example, referring to FIG. 1, the confidence score prediction component(s) 122 of the ML model 112 may generate the confidence score data 154 based on the scan traffic data 150. The respective confidence scores for each of the individual potential security vulnerabilities may correspond to the confidence score(s) 180 presented to an analyst via the vulnerability analysis GUI 128.

At operation 1330, the process includes determining whether an individual confidence score for a particular potential security vulnerability satisfies a confidence score threshold. For example, referring to FIG. 1, the filter component(s) 164 of the vulnerability analysis GUI 128 may be configured to individually evaluate the one or more confidence scores 180 associated with various potential security vulnerabilities in comparison to a confidence score threshold.

If the individual confidence score does not satisfy the confidence score threshold, the process proceeds to operation 1340. At operation 1340, the process includes automatically changing a verification status from an unverified vulnerability to a false positive. For example, referring to FIG. 1, the filter component(s) 164 of the vulnerability analysis GUI 128 may be configured to automatically change a verification status from an unverified vulnerability to a false positive. As an illustrative, non-limiting example, the filter component(s) 164 of the vulnerability analysis GUI 128 may be configured to automatically label any potential security vulnerability with a confidence score that is less than fifteen percent as a false positive.

If the individual confidence score satisfies the confidence score threshold, the process proceeds to operation 1350. At operation 1350, the process includes retaining a verification status of an unverified vulnerability for the particular potential security vulnerability. For example, referring to FIG. 1, the filter component(s) 164 of the vulnerability analysis GUI 128 may be configured to retain a verification status of an unverified vulnerability for any potential security vulnerability that satisfies the confidence score threshold. As an illustrative, non-limiting example, the filter component(s) 164 of the vulnerability analysis GUI 128 may be configured to retain a verification status of an unverified vulnerability for any potential security vulnerability with a confidence score that is fifteen percent or greater.

At operation 1360, the process includes, responsive to a request for scan findings associated with a particular application, displaying the respective confidence scores via a vulnerability analysis GUI for a subset of the potential security vulnerabilities that retain the verification status of unverified vulnerability. For example, referring to FIG. 1, the filter component(s) 164 may be configured to display the respective confidence scores via the vulnerability analysis GUI 128 for an identified subset of the potential security vulnerabilities that retain the verification status of unverified vulnerability.

Thus, FIG. 13 illustrates that the confidence scores generated by the ML model 112 of the present disclosure may be used for bulk false positive labeling of findings.

FIG. 14 is a flowchart 1400 that illustrates an example process of utilizing confidence scores calculated by a ML model to evaluate a security vulnerability remediation attempt, according to some embodiments.

At operation 1410, the process includes obtaining scan traffic data associated with potential security vulnerabilities detected via one or more scan engines that implement application security testing. For example, referring to FIG. 1, the one or more scan engines 130 that implement application security testing may be utilized to obtain the scan traffic data 150 associated with one or more potential security vulnerabilities.

At operation 1420, the process includes determining, using a ML model for calculating confidence scores associated with potential security vulnerabilities detected via application security testing, respective confidence scores for each of the individual potential security vulnerabilities. For example, referring to FIG. 1, the confidence score prediction component(s) 122 of the ML model 112 may generate the confidence score data 154 based on the scan traffic data 150. The respective confidence scores for each of the individual potential security vulnerabilities may correspond to the confidence score(s) 180 presented to an analyst via the vulnerability analysis GUI 128.

At operation 1430, the process includes performing one or more remediation operations for at least a subset of the potential security vulnerabilities. For example, referring to FIG. 1, one or more remediation operations may be performed for at least a subset of the potential security vulnerabilities associated with the one or more applications 142 hosted at the one or more application servers 140.

At operation 1440, the process includes prioritizing the individual potential security vulnerabilities in the subset for subsequent application security testing based at least in part on their respective confidence scores. For example, referring to FIG. 1, findings that originally had a high confidence score can be prioritized and re-scanned by the scan engine(s) 130 ahead of those with lower confidence scores. This may allow faster checking as to whether or not remediation has been completed for findings originally predicted by the ML model 112 as more likely to be real vulnerabilities. If a next confidence score predicted by the confidence score prediction component(s) 122 is lower than an original confidence score, then this may be indicative of a successful remediation of the security vulnerability.

Thus, FIG. 14 illustrates that the confidence scores generated by the ML model 112 of the present disclosure may be used to streamline follow-up and remediation scans.

FIG. 15 is a block diagram illustrating an example computer system 1500 that is used to implement one or more portions of a system that implements a machine learning (ML) model for calculating confidence scores associated with potential security vulnerabilities detected via application security testing, according to some embodiments. For example, the computer system 1500 may be a server that implements one or more components of the computing resource(s) 110 of FIG. 1.

Computer system 1500 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1500 includes one or more processors 1510, which may include multiple cores coupled to a system memory 1520 via an input/output (I/O) interface 1530. Computer system 1500 further includes a network interface 1540 coupled to I/O interface 1530. In some embodiments, computer system 1500 may be a uniprocessor system including one processor 1510, or a multiprocessor system including several processors 1510*a-n*, as shown. The processors 1510 may be any suitable processors capable of executing instructions. For example, in various embodiments, processors 1510 may implement one of a number of instruction set architectures (ISAs), such as the x86, PowerPC, SPARC, or MIPS ISA.

As shown, the computer system 1500 may also include one or more network communication devices (e.g., network interface 1540) for communicating with other systems and/or components over a communications network. For example, an instance of an application executing on computer system 1500 may use network interface 1540 to communicate with another server application executing on another computer system, as described herein.

As shown, computer system 1500 may use its network interface 1540 to communicate with one or more other devices 1560, such as persistent storage devices and/or one or more I/O devices. In some embodiments, some of these other devices may be implemented locally on the computer system 1500, accessible via the I/O interface 1530. In various embodiments, persistent storage devices may include disk drives, tape drives, solid state memory, other mass storage devices, or any other persistent storage device. The computer system 1500 may store instructions and/or data in persistent storage devices, and retrieve the stored instruction and/or data as needed.

As shown, the computer system 1500 may include one or more system memories 1520 that store instructions and data accessible by processor(s) 1510. In various embodiments, system memories 1520 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1520 may be used to store code 1525 or executable instructions to implement the methods and techniques described herein. For example, the executable instructions may include instructions to implement the model training component(s) 114, the input processing component(s) 120, the confidence score prediction component(s) 122, the feedback processing component(s) 124, and the GUI component(s) 126, as discussed. The system memory 1520 may also be used to store data 1526 needed or produced by the executable instructions. For example, the in-memory data 1526 may include portions of the vulnerability data 116, the scan traffic data 150, the confidence score(s) 180, and the analyst feedback data 190, as discussed.

In some embodiments, some of the code 1525 or executable instructions may be persistently stored on the computer system 1500 and may have been loaded from external storage media. The persistent storage of the computer system 1500 and the external media are examples of non-transitory computer-readable storage media, which may be used to store program instructions to be executed by the computer system 1500. A non-transitory computer-readable storage medium may provide the capability to store information in a form readable by a machine (e.g., computer system 1500). Non-transitory computer-readable media may include storage media such as magnetic or optical media, disk or DVD/CD-ROM devices, archival tapes, network-attached storage systems, or other computer systems.

In some embodiments, the I/O interface 1530 may be configured to coordinate I/O traffic between processor 1510, system memory 1520 and any peripheral devices in the system, including through network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB)

standard, for example. In some embodiments, the function of I/O interface 1530 may be split into two or more separate components, such as a north bridge and a south bridge, for example. Also, in some embodiments, some or all of the functionality of I/O interface 1530, such as an interface to system memory 1520, may be incorporated directly into processor 1510.

In some embodiments, the network interface 1540 may allow data to be exchanged between computer system 1500 and other devices attached to a network. The network interface 1540 may also allow communication between computer system 1500 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 1500 or may be distributed on various nodes of a distributed system that includes computer system 1500. In some embodiments, similar input/output devices may be separate from computer system 1500 and may interact with one or more nodes of a distributed system that includes computer system 1500 through a wired or wireless connection, such as over network interface 1540. Network interface 1540 may commonly support one or more wireless networking protocols (e.g., Wi-Fi/IEEE 802.11, or another wireless networking standard). In some embodiments, the network interface 1540 may support communication via telecommunications/telephony networks such as analog voice networks or digital fiber communications networks, via storage area networks such as Fibre Channel SANS, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:

one or more hardware processors with associated memory that implement a machine learning (ML) model for calculating confidence scores associated with potential security vulnerabilities detected via application security testing of an application accessible over a network, wherein the one or more hardware processors are configured to:

obtain scan traffic data associated with a particular scan finding generated by one or more scan engines that a particular potential security vulnerability is detected in the application during application security testing based on the scan traffic data, wherein the scan traffic data is generated as a result of one or more requests sent to the application over the network and includes one or more responses of the application received over the network in response to the one or more requests;

use the ML model to evaluate the scan traffic data and generate a confidence score for the particular scan finding, wherein the ML model is trained using training data that includes (a) previous scan traffic data for the application, (b) previous scan findings indicating different previous detections of potential security vulnerabilities in the application based on the previous scan traffic data, and (c) labels reflecting previous analyst determinations of whether individual ones of the previous detections of potential security vulnerabilities were true positives or false positives after manual investigation of the previous scan findings;

generate a vulnerability analysis graphical user interface that displays a list of scan findings indicating potential security vulnerabilities in the application detected by the one or more scan engines, wherein the list is ranked based on respective confidence scores and severity levels of the potential security vulnerabilities;

responsive to a selection of the particular potential security vulnerability via the vulnerability analysis graphical user interface, generate a vulnerability details graphical user interface that contains vulnerability information including the confidence score generated by the ML model for the particular potential security vulnerability and the severity score of the particular potential security vulnerability;

receive, via the vulnerability details graphical user interface, input indicative of a change of verification status for the particular potential security vulnerability;

responsive to determining that the confidence score generated by the ML model is inconsistent with the change of verification status, send the change of verification status as analyst feedback data to one or more model training components of the ML model; and utilize the one or more model training components to refine the ML model based at least in part on the analyst feedback data, including to perform additional training of the ML model using the analyst feedback data.

2. The system of claim 1, wherein the one or more hardware processors are configured to:

responsive to user input received via the vulnerability analysis graphical user interface, sort or filter the list of scan findings indicating potential security vulnerabilities in the application based on the respective confidence scores and severity levels of the potential security vulnerabilities.

3. The system of claim 1, wherein the confidence score generated by the ML model for the particular potential security vulnerability corresponds to a percentage value within a range of zero percent to one-hundred percent.

4. The system of claim 1, wherein the ML model is retrained based on additional training data on a weekly, fortnightly, or monthly basis.

5. The system of claim 1, wherein the ML model is retrained based on additional training data when a sufficient number of scan findings have been reviewed by security analysts.

6. The system of claim 1, wherein:

the vulnerability details graphical user interface includes a selectable option to change the verification status of the particular potential security vulnerability to identify the particular potential security vulnerability as a true positive; and the change of verification status is sent as analyst feedback data to the one or more model training components of the ML model responsive to determining that the confidence score is indicative of the ML model having determined that the particular potential security vulnerability is most likely to be a false positive.

7. The system of claim 6, wherein the confidence score for the particular potential security vulnerability corresponds to a percentage value that is less than fifty percent.

8. The system of claim 6, wherein the one or more hardware processors are configured to generate an alert to notify an analyst that the confidence score is indicative of the ML model having determined that the particular potential security vulnerability is most likely to be a false positive prior to sending the change of verification status as analyst feedback data.

9. The system of claim 1, wherein:

the vulnerability details graphical user interface includes a selectable option to change the verification status of the particular potential security vulnerability to identify the particular potential security vulnerability as a false positive; and the change of verification status is sent as analyst feedback data to the one or more model training components of the ML model responsive to determining that the confidence score is indicative of the ML model having determined that the particular potential security vulnerability is most likely to be a true positive.

10. The system of claim 9, wherein the confidence score for the particular potential security vulnerability corresponds to a percentage value that is at least fifty percent.

11. A method comprising:

implementing, using one or more hardware processors, a machine learning (ML) model for calculating confidence scores associated with potential security vulnerabilities detected via application security testing of an application accessible over a network, wherein the implementing comprises:

obtaining scan traffic data associated with a particular scan finding generated by one or more scan engines that a particular potential security vulnerability is detected in the application during application security testing based on the scan traffic data, wherein the scan traffic data is generated as a result of one or more requests sent to the application over the network and includes one or more responses of the application received over the network in response to the one or more requests;

using the ML model to evaluate the scan traffic data and generate a confidence score for the particular scan finding, wherein the ML model is trained using training data that includes (a) previous scan traffic data for the application, (b) previous scan findings indicating different previous detections of potential security vulnerabilities in the application based on the previous scan traffic data, and (c) labels reflecting previous analyst determinations of whether individual ones of the previous detections of potential security vulnerabilities were true positives or false positives after manual investigation of the previous scan findings;

generating a vulnerability analysis graphical user interface that displays a list of scan findings indicating potential security vulnerabilities in the application detected by the one or more scan engines, wherein the list is ranked based on respective confidence scores and severity levels of the potential security vulnerabilities;

responsive to a selection of the particular potential security vulnerability via the vulnerability analysis graphical user interface, generating a vulnerability details graphical user interface that contains vulnerability information including the confidence score generated by the ML model for the particular potential security vulnerability and the severity score of the particular potential security vulnerability;

receiving, via the vulnerability details graphical user interface, input indicative of a change of verification status for the particular potential security vulnerability;

responsive to determining that the confidence score generated by the ML model is inconsistent with the change of verification status, sending the change of verification status as analyst feedback data to one or more model training components of the ML model; and utilizing the one or more model training components to refine the ML model based at least in part on the analyst feedback data, including performing additional training of the ML model using the analyst feedback data.

12. The method of claim 11, wherein the method further comprises:

monitoring a performance metric of the one or more scan engines, wherein the performance metrics is based on the confidence score; and responsive to a determination that the performance metric has dropped below a threshold, generating a message indicating to update the one or more scan engines or a regular expression pattern used by the one or more scan engines to detect the particular potential security vulnerability.

13. The method of claim 11, wherein:

the confidence score generated by the ML model for the particular potential security vulnerability corresponds to a percentage value within a range of zero percent to one-hundred percent;

the confidence score having a percentage value of zero percent is indicative of the ML model having determined that the particular potential security vulnerability is most likely to be a false positive; and the confidence score having a percentage value of one-hundred percent is indicative of the ML model having determined that the particular potential security vulnerability is most likely to be a true positive.

14. The method of claim 11, wherein:

the vulnerability details graphical user interface includes a selectable option to change the verification status of the particular potential security vulnerability to identify the particular potential security vulnerability as a true positive; and the change of verification status is sent as analyst feedback data to the one or more model training components of the ML model responsive to determining that the confidence score is indicative of the ML model having determined that the particular potential security vulnerability is most likely to be a false positive based at least in part on the confidence score corresponding to a percentage value that is less than fifty percent.

15. The method of claim 14, wherein the method further comprises generating an alert to notify an analyst that the confidence score is indicative of the ML model having determined that the particular potential security vulnerability is most likely to be a false positive prior to sending the change of verification status as analyst feedback data.

16. The method of claim 11, wherein:

the vulnerability details graphical user interface includes a selectable option to change the verification status of the particular potential security vulnerability to identify the particular potential security vulnerability as a false positive; and the change of verification status is sent as analyst feedback data to the one or more model training components of the ML model responsive to determining that the confidence score is indicative of the ML model having determined that the particular potential security vulnerability is most likely to be a true positive based at least in part on the confidence score corresponding to a percentage value that is at least fifty percent.

17. One or more non-transitory computer-accessible storage media storing program instructions that, when executed on or across one or more processors, implement at least a portion of a system that implements a machine learning (ML) model for calculating confidence scores associated with potential security vulnerabilities detected via application security testing of an application accessible over a network and cause the system to:

obtain scan traffic data associated with a particular scan finding generated by one or more scan engines that a particular potential security vulnerability is detected in the application during application security testing based on the scan traffic data, wherein the scan traffic data is generated as a result of one or more requests sent to the application over the network and includes one or more responses of the application received over the network in response to the one or more requests;

use the ML model to evaluate the scan traffic data and generate a confidence score for the particular scan finding, wherein the ML model is trained using training data that includes (a) previous scan traffic data for the application, (b) previous scan findings indicating different previous detections of potential security vulnerabilities in the application based on the previous scan traffic data, and (c) labels reflecting previous analyst determinations of whether individual ones of the previous detections of potential security vulnerabilities were true positives or false positives after manual investigation of the previous scan findings;

generate a vulnerability analysis graphical user interface that displays a list of scan findings indicating potential security vulnerabilities in the application detected by the one or more scan engines, wherein the list is ranked based on respective confidence scores and severity levels of the potential security vulnerabilities;

responsive to a selection of the particular potential security vulnerability via the vulnerability analysis graphical user interface, generate a vulnerability details graphical user interface that contains vulnerability information including the confidence score generated by the ML model for the particular potential security vulnerability and the severity score of the particular potential security vulnerability;

receive, via the vulnerability details graphical user interface, input indicative of a change of verification status for the particular potential security vulnerability;

responsive to determining that the confidence score generated by the ML model is inconsistent with the change of verification status, send the change of verification status as analyst feedback data to one or more model training components of the ML model; and utilize the one or more model training components to refine the ML model based at least in part on the analyst feedback data, including to perform additional training of the ML model using the analyst feedback data.

18. The one or more non-transitory computer-accessible storage media of claim 17, wherein the program instructions when executed on or across one or more processors cause the system to:

responsive to user input received via the vulnerability analysis graphical user interface, sort or filter the list of scan findings indicating potential security vulnerabilities in the application based on the respective confidence scores and severity levels of the potential security vulnerabilities.

19. The one or more non-transitory computer-accessible storage media of claim 17, wherein:

the application security testing simulates an attack on the application to exploit the particular potential security vulnerability; and the vulnerability details graphical user interface includes a selectable option to replay the attack, wherein the analyst feedback is generated based on a result of the replay.

20. The one or more non-transitory computer-accessible storage media of claim 17, wherein:

the vulnerability details graphical user interface includes a selectable option to change the verification status of the particular potential security vulnerability to identify the particular potential security vulnerability as a false positive; and the change of verification status is sent as analyst feedback data to the one or more model training components of the ML model responsive to determining that the confidence score corresponds to a percentage value that is at least fifty percent which is indicative of the ML model having determined that the particular potential security vulnerability is most likely to be a true positive based at least in part on the confidence score corresponding to a percentage value that is at least fifty percent.

* * * * *